United States Patent
Guo et al.

(10) Patent No.: US 10,716,064 B2
(45) Date of Patent: *Jul. 14, 2020

(54) DISTRIBUTED SLEEP MANAGEMENT FOR BATTERY POWERED MULTI-HOP HETEROGENEOUS WIRELESS NETWORK

(71) Applicant: Mitsubishi Electric Research Laboratories, Inc., Cambridge, MA (US)

(72) Inventors: Jianlin Guo, Newton, MA (US); Evripidis Paraskevas, College Park, MD (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/941,999

(22) Filed: Mar. 30, 2018

(65) Prior Publication Data

US 2018/0227846 A1    Aug. 9, 2018

Related U.S. Application Data

(63) Continuation of application No. 14/969,279, filed on Dec. 15, 2015, now Pat. No. 9,986,502.

(51) Int. Cl.
*H04W 52/02* (2009.01)

(52) U.S. Cl.
CPC .... *H04W 52/0212* (2013.01); *H04W 52/0235* (2013.01); *Y02D 70/00* (2018.01); *Y02D 70/22* (2018.01)

(58) Field of Classification Search
None
See application file for complete search history.

(56) References Cited

U.S. PATENT DOCUMENTS

| 7,298,716 B2 | 11/2007 | Abraham et al. |
| 7,356,561 B2 | 4/2008 | Balachandran et al. |
| 9,986,502 B2 * | 5/2018 | Guo .................. H04W 52/0212 |

* cited by examiner

*Primary Examiner* — Ayaz R Sheikh
*Assistant Examiner* — Sori A Aga
(74) *Attorney, Agent, or Firm* — Gennadiy Vinokur; James McAleenan; Hironori Tsukamoto

(57) ABSTRACT

A network of nodes includes data nodes and at least one sink node to exchange packets between the sink node and the data nodes in a multi-hop manner. The data nodes include a battery powered node (BPN) having a transceiver, a memory, and a battery to provide energy to components of the BPN. The BPN includes a processor to determine a sleep schedule of the BPN independently from the sleep schedules of other data nodes and independently from commands transmitted by the sink node. The processor of the BPN switches the transceiver ON and OFF according to the sleep schedule to form an active period and a sleep period of the BPN. Also, the processor partitions at least part of the active period into a receiving (RX) period and a transmission (TX) period and causes the transceiver to transmit the data packets only during the TX period.

14 Claims, 16 Drawing Sheets

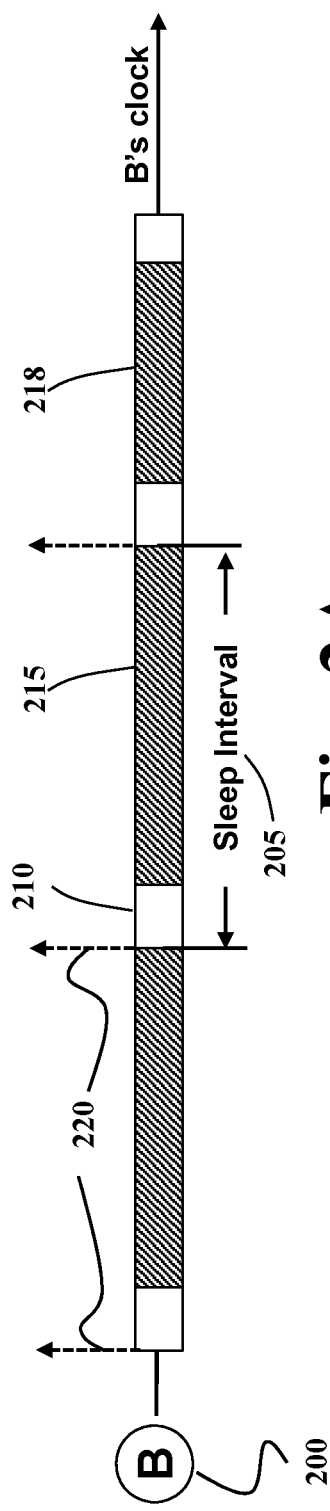
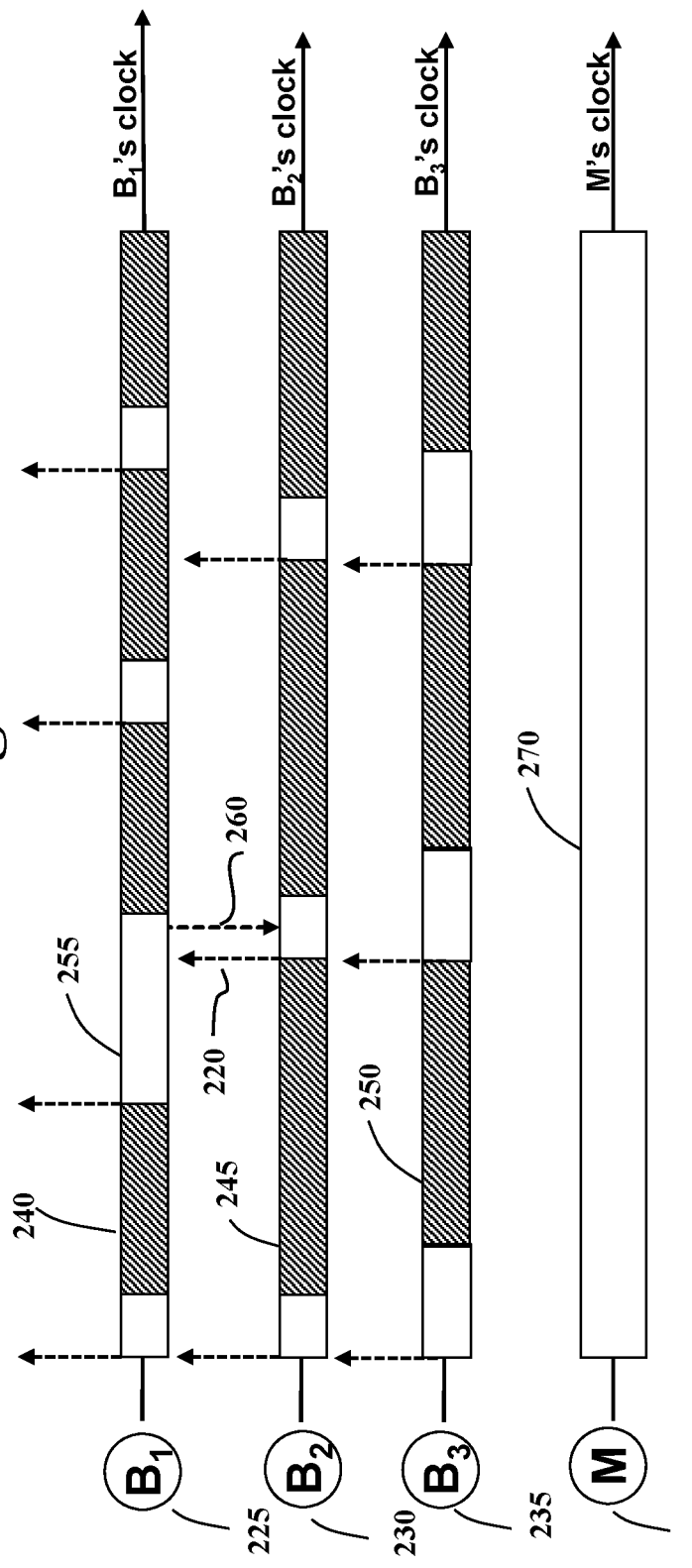
Fig. 2A
Fig. 2B

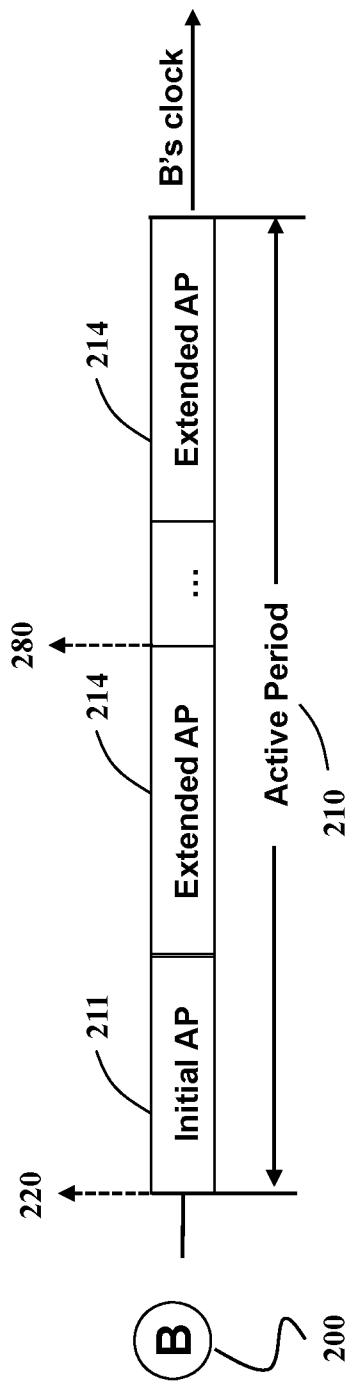
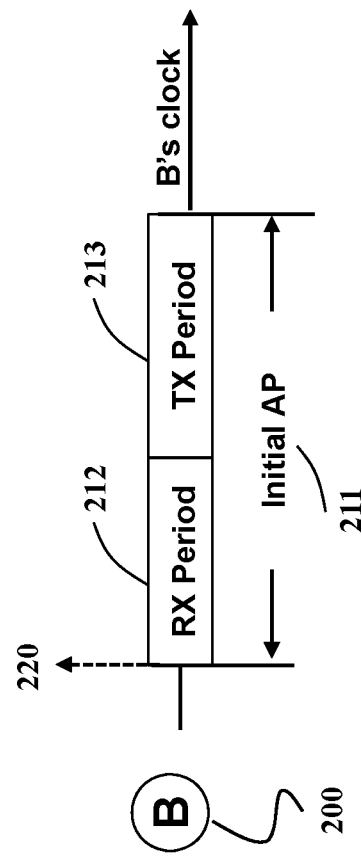
Fig. 2C
Fig. 2D

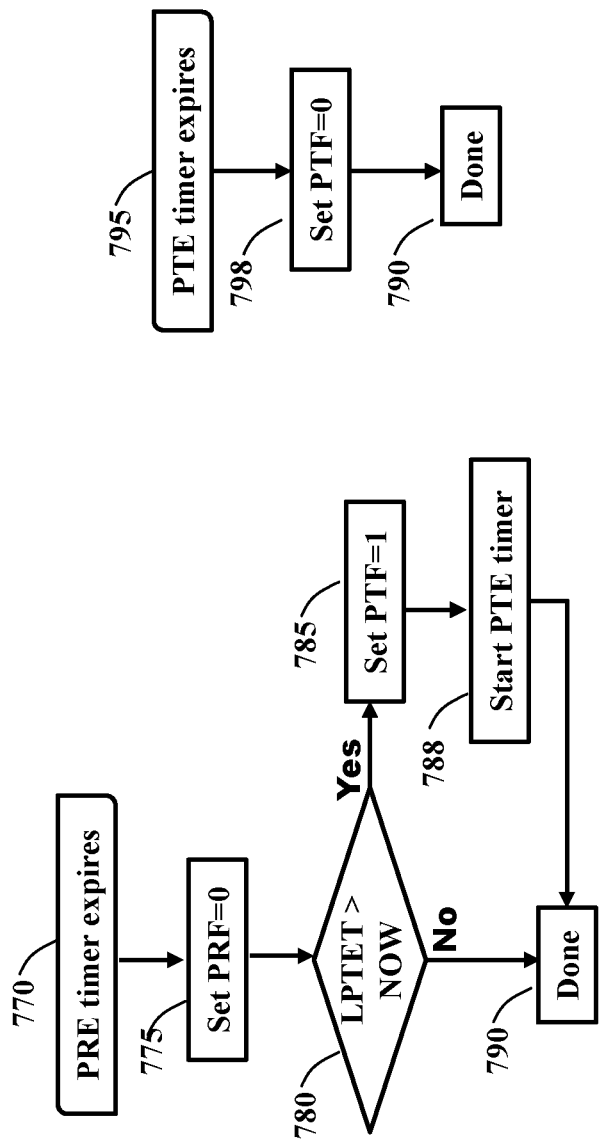

DISTRIBUTED SLEEP MANAGEMENT FOR BATTERY POWERED MULTI-HOP HETEROGENEOUS WIRELESS NETWORK

FIELD OF THE INVENTION

This invention relates generally to management of wireless networks, and particularly to sleep management of battery-powered nodes forming a multi-hop heterogeneous wireless network.

BACKGROUND OF THE INVENTION

Energy efficient management, such as routing of data packets, is a critical issue for networks including nodes with constrained power source. According to the power source of the node, the nodes can be classified into two categories, i.e., nodes with constrained power source such as battery-powered nodes (BPNs) and nodes with un-constrained power source such as mains-powered nodes (MPNs). In some applications, battery replacement is impractical or impossible. Therefore, in wireless networks including the BPNs, prolonging network lifetime becomes critical. The network lifetime is generally defined by the operation time of the battery powered node that first runs out of battery power.

Based on resource and capability of the node, the wireless networks can be classified into homogeneous and heterogeneous. In a homogeneous wireless network, all nodes have identical resources and capabilities. All nodes are either battery powered, or mains powered. A wireless sensor network is an example of homogeneous wireless network in which all nodes are typically battery powered. Electric smart meter network is another example of homogeneous wireless network in which all nodes are mains powered. On the other hand, in a heterogeneous wireless network, nodes have different resources and capabilities, e.g., some nodes can be battery powered and have small memory and limited computational capabilities, and other nodes can be mains powered and have greater memory and computational capabilities.

In a wireless network with battery powered nodes, a key objective of network management, such as routing, is to maximize the network lifetime. A node consumes its energy for data transmission, data receiving, control message transmission and control message receiving. This category of energy consumption is considered as necessary energy use. A node also consumes its energy on idle listening, overhearing, collision and retransmission. This category of energy consumption is considered as energy waste. One of the main goals for the energy saving management is to minimize the energy waste.

However, the energy related management methods designed for homogeneous wireless network do not work well for heterogeneous wireless networks. For example, the routing methods designed for homogeneous networks do not consider and leverage heterogeneity. In addition, some methods reduce the energy consumption of the homogeneous network by synchronizing operations of the nodes of the network. See, e.g., U.S. Pat. Nos. 7,298,716 and 7,356,561 describing methods that use centralized sleep control mechanism in which a node can only sleep during a pre-specified time period. However, the synchronization of the network can reduce the collision of the data packets, but also can increase idle time resulting in additional energy waste. In addition, synchronization packet transmission and receiving also result in extra energy waste.

Accordingly, there is a need to provide a system and a method for energy efficient management of multi-hop heterogeneous wireless networks including battery-powered nodes and mains-powered nodes.

SUMMARY OF THE INVENTION

It is an object of various embodiments of the invention to provide a system and a method for sleep management of multi-hop heterogeneous wireless networks having at least one sink node and data nodes including battery powered nodes (BPNs) and mains powered nodes (MPNs). It is another object of some embodiments to provide a distributed sleep control methods for multi-hop heterogeneous wireless network so that data nodes do not require synchronization operations. Additionally, it is an object of some embodiments of the invention to provide energy efficient routing metrics for transmitting packets in a multi-hop manner in which at least one data node exchanging the packets with the sink node through at least one intermediate data node relaying the packets between the data node and the sink node.

Some embodiments of the invention are based on recognition that centralized sleep management is more advantageous for a single-hop network than a multi-hop network. This is because the synchronization of the multi-hop network results in more packet relay, which increases more idle time to listen for synchronization packets, to receive synchronization packets and to retransmit synchronization packets and therefore, results in more energy waste. In addition, in a multi-hop wireless network, the centralized control node does not know when data nodes multiple hops away have data to transmit and how much data they have. Therefore, it is impractical for a centralized control node to schedule sleep schedules for those nodes. Some embodiments of the invention are also based on recognition that the centralized sleep management is more advantageous for homogeneous network than heterogeneous network. This is because in a heterogeneous network, mains powered nodes do not sleep and are always active. Therefore, data relay using mains powered nodes is preferred.

Accordingly, some embodiments of the invention provide distributed sleep management methods to manage sleep schedules of the data nodes of the heterogeneous network. For example, in one embodiment, the mains powered nodes have only active periods, i.e., the nodes do not have sleep periods. In contrast, the battery powered nodes have both the active period and sleep period, but determine a schedule of the active and sleep periods independently from the active and sleep periods of other data nodes in the network or commands transmitted by the sink node.

In various embodiments, a BPN determines a schedule of active and sleep periods of the BPN independently from the active and sleep periods of other data nodes in the network and independently from commands transmitted by the sink node. In such a manner, the decentralized sleep management is achieved. For example, BPN can determine the schedule based on information internal to the BPN using activities of the network sensed by the BPN. For example, the BPN can determine the schedule based on a number of data packets buffered in a queue of the BPN.

Some embodiments of the invention are based on additional realization that in some situations the decentralized sleep management can lead to increased collision rate of the transmitted data packets. In turn, the increased collision rate leads to retransmissions of the data packets, which increase the energy waste.

Some embodiments are based on understanding that a cause for the increased collision rate lies at least in part in the distribution nature of the sleep management, which, in contrast with the centralized management, allows the nodes to determine times for their own transmission. For example, upon waking up, the BPN can start transmitting data packet stored or generated by the BPN during the sleep period. It is logical operation for the BPN, because the data packets self-generated by the BPN during its sleep period accumulate in the queue and can overflow the memory of the BPN. Similarly, when the neighboring nodes receive the wakeup signal from the BPN, the nodes can start to transmit their data packets to the BPN. It is also logical operation for the neighboring nodes, because the neighboring nodes need to transmit their data packets to go to the sleep period and to conserve energy. As a result, the burst of transmission can occur, which can lead to the packets collision.

Some embodiments of the invention addressed this problem by partitioning at least part of the active period of the BPN into a receiving (RX) period and a transmission (TX) period and transmitting the data packets during the TX period, e.g., after expiration of the RX period. In such a manner, the RX period is reserved for the incoming transmission, which let neighboring node go to sleep early. Such a reservation separate receiving and transmitting modes of the BPN and reduces the likelihood of collision.

Accordingly, one embodiment of the invention discloses a network of nodes including data nodes and at least one sink node, wherein the network is a multi-hop heterogeneous wireless network in which packets are exchanged between the sink node and the data nodes in a multi-hop manner such that there is at least one data node exchanging the packets with the sink node through at least one intermediate data node relaying the packets between the data node and the sink node, the data nodes include battery powered nodes (BPNs) and mains powered nodes (MPNs).

The BPN includes a transceiver to transmit and to receive data packets; a memory to buffer data packets in a queue; a battery to provide energy to components of the BPN; and a processor to determine a sleep schedule of the BPN independently from the sleep schedules of other data nodes in the network and independently from commands transmitted by the sink node, wherein the processor of the BPN switches the transceiver ON and OFF according to the sleep schedule to form an active period of BPN when the transceiver is switched ON and to form a sleep period of BPN when the transceiver is switched OFF. The processor partitions at least part of the active period into a receiving (RX) period and a transmission (TX) period and causes the transceiver to transmit the data packets only during the TX period.

Another embodiment discloses a computer-implemented method for managing a battery-powered node (BPN) forming a multi-hop heterogeneous wireless network of nodes including data nodes and at least one sink node, wherein the data nodes include battery-powered nodes (BPNs) and mains-powered nodes (MPNs). The method is implemented using a processor of the BPN executing instructions stored in a memory of the BPN.

The method includes determining a sleep schedule of the BPN independently from the sleep schedules of other data nodes in the network and independently from commands transmitted by the sink node to form an active period of BPN when a transceiver of the BPN is switched ON and to form a sleep period of BPN when the transceiver is switched OFF; transmitting at least some data packets stored in a queue of the BPN if the queue overflows; partitioning at least part of the active period into a receiving (RX) period and a transmission (TX) period; transmitting a wakeup signal specifying the partitioning of the part of the active period; and transmitting the data packets during the TX period after expiration of the RX period.

BRIEF DESCRIPTION OF THE DRAWINGS

FIG. 2A is a schematic of a sleep interval configuration according to some embodiments of an invention;

FIG. 2B is a schematic of a distributed sleep control model used by battery powered nodes according to some embodiments of the invention;

FIG. 2C is a schematic of active period configuration for the battery powered node based on the distributed sleep control model according to some embodiments of the invention;

FIG. 2D is a schematic of an initial active period configuration of an active period based on the distributed sleep control model according to some embodiments of the invention;

FIG. 7B is a block diagram of the method for the data node to perform at the latest parent receiving ending time according to some embodiments of the invention;

FIG. 7C is a block diagram of the method for the data node to perform at the latest parent transmission ending time according to some embodiments of the invention.

DETAILED DESCRIPTION OF THE PREFERRED EMBODIMENTS

Figure 1A:
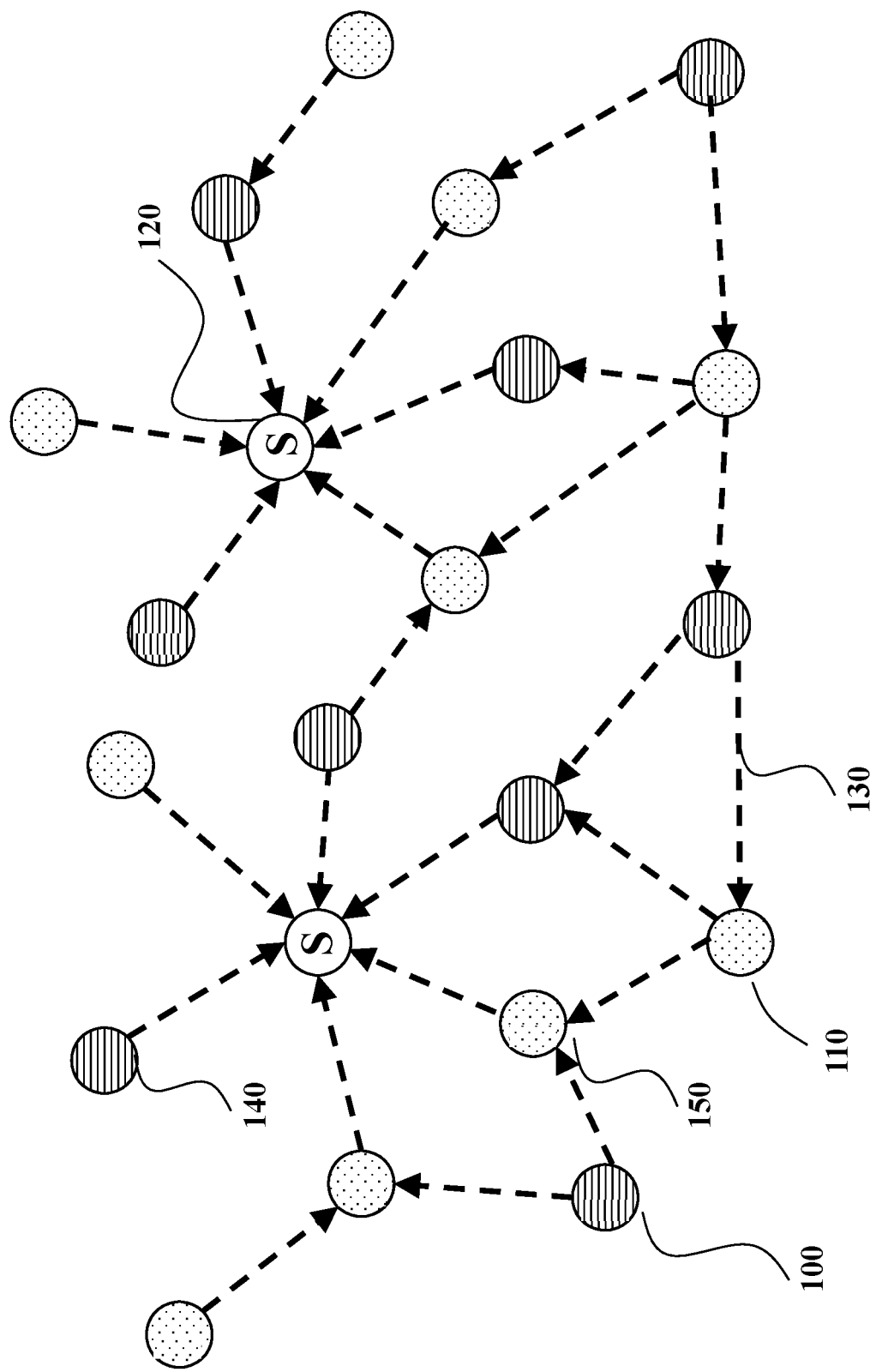
FIG. 1A is schematic of a multi-hop heterogeneous wireless network according to some embodiments of an invention.

FIG. 1A shows a schematic of an example of multi-hop heterogeneous wireless network that uses embodiments of the inventions. The network includes data nodes such as battery powered node (BPN) 100 and mains powered node (MPN) 110. The network also includes sink nodes (S) 120. The data nodes and sink nodes form a wireless mesh network using directed wireless links 130, where the general flow of data packets is from the data nodes (battery powered nodes or mains powered nodes) to sink nodes and/or from sink nodes to data nodes, although control messages can be sent in either direction.

The network is a multi-hop wireless network in which packets are exchanged between the sink nodes and the data nodes in a multi-hop manner such that there is at least one data node exchanging the packets with the sink nodes through at least one intermediate data node relaying the packets between the data node and the sink nodes. For example, some data nodes, e.g., 140, can transmit data packets directly to a sink node. Some of data nodes, e.g., 100 and 110, cannot directly transmit data packets to any sink node. Instead, the data packets are first transmitted to intermediate or relay nodes, which then relay the packets to sink nodes. In other words, data delivery is conducted in a multi-hop manner.

In a multi-hop wireless network, parent of a data node is defined as an immediate successor of the node on a path towards the destination node. For example, node 150 is the parent of node 110 and node 100. In addition, child of a data node is defined as an immediate predecessor of the node on a path towards the destination node. For example, node 100 and node 110 are children of node 150. For point-to-point (P2P) data traffic pattern, each data node can be destination node, data source node and relay node. For multipoint-to-point (MP2P) data traffic pattern shown in FIG. 1A, sink node is destination node and data node can be data source node and relay node. For point-to-multipoint (P2MP) data traffic pattern, node S is data source node, other node can be destination node and relay node.

Even embodiments of invention is illustrated using MP2P data traffic pattern, the methods provided can be applied to P2P data traffic pattern and P2MP data traffic pattern.

Figure 1B:
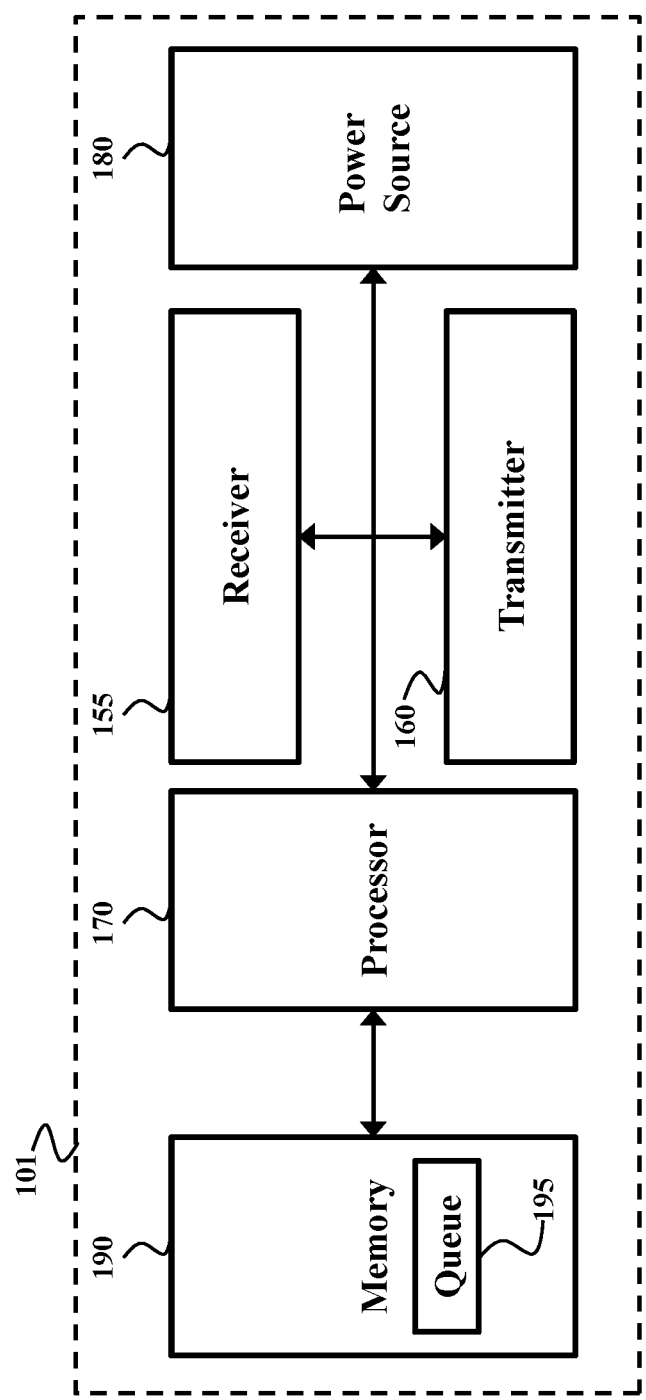
FIG. 1B is a block diagram of a structure of a data node, such as a battery powered node (BPN) and/or a mains powered node (MPN), in the network of FIG. 1A.

FIG. 1B shows schematically a structure of the data node 101 forming the network of FIG. 1A. The data node includes a transceiver for transmitting and receiving data packets, which includes one or combination of a receiver 155 and a transmitter 160. The data node also includes a power source 180 for supplying power. According to a type of the power source 180, the nodes can be classified into two categories, i.e., the battery powered nodes have limited power supply such as a battery and mains powered nodes have unlimited power supply such as a power grid. In some embodiments, there is no restriction on power source of the sink nodes, which can either be mains powered or battery powered.

The data node 101 includes a processor 170 for performing operations of the node and/or for determining a schedule of active and sleep periods of the node. Each data node transmits and receives the packets only during corresponding active periods.

According to some embodiments, the battery powered nodes have active and sleep periods and mains powered nodes have only active periods. If the data node 101 is a battery powered node, e.g., the power source 180 is a battery, then the processor determines the schedule of active and sleep periods of the battery powered node and switches the transceiver ON and OFF according to the schedule.

The data node 101 also includes a memory 190 to be used by processor 170 to store necessary information. A portion of memory 195 is used to buffer data packets of the data node. This memory section is called queue.

Distributed Sleep Management

Some embodiments of the invention are based on recognition that the centralized sleep management is more advantageous for single hop homogeneous network rather than multi-hop heterogeneous network.

Some embodiments of the invention are based on recognition that the centralized management is more advantageous for homogeneous rather than heterogeneous network. This is because the synchronization of the network results in energy waste. For example, a centralized sleep control method can reduce the collision of data packets transmission, but also can increase idle time of the nodes, especially in situations when data transmission over mains-powered nodes is preferred.

In various embodiments of the invention, the processor of the BPN determines the schedule independently from the active and sleep periods of other data nodes in the network and independently from any commands transmitted by the sink node. For example, the processor of the BPN determines the schedule based on information internal to the BPN using activities of the network observed by the BPN. For example, the data node 101 includes a memory 190 for buffering the data packets to be transmitted to the sink node. In one embodiment, the processor determines the schedule based on a number of the data packets in the memory, e.g., the active or sleep period is proportional to the number of the data packets in the memory.

FIG. 2A shows a schematic of the distributed sleep management model according to some embodiments of the invention. In these embodiments, a BPN 200 manages its own schedule of active and sleeps intervals. Time is partitioned into sleep intervals with different lengths. A sleep interval 205 includes an active period 210 followed by a sleep period 215. The order of active and sleep periods varies for different embodiments. When BPN 200 goes to sleep, its transceiver is turned OFF. When the BPN 200 wakes up from the sleep, its transceiver is turned ON, and the BPN transmits a wakeup message 220 to inform neighboring data nodes that the BPN 200 is active. If the neighboring nodes have data packets to be sent to the BPN 200, then the neighboring node can initiate that transmission. The node dynamically determines the lengths of active period 210 and sleep period 215, i.e., the schedule of the active and sleep periods does not have to be periodic. For example, a sleep period 218 is shorter than sleep period 215.

FIG. 2B shows schematic of a distributed sleep management model according to some embodiments of an invention. Different nodes can have different active period and sleep period lengths, in which battery powered nodes $B_1$ 225, $B_2$ 230 and $B_3$ 235 have different length sleep periods 240, 245 and 250, respectively.

With the distributed sleep management model, if a battery powered node has no data to transmit, then the node schedules periodic sleep intervals. For example, nodes $B_2$ 230 and $B_3$ 235 have no data to transmit, and therefore, they perform periodic sleep scheduling. However, if a battery powered node has data to transmit to another battery powered node, as in one embodiment, then the sender node waits for a wakeup message 220 from the recipient battery powered node. In this case, the sender node prolongs its active period. For example, the node $B_1$ has data to send to a battery powered node $B_2$. Node $B_1$ extends its active period 255 and waits for a wakeup message from node $B_2$. Upon receiving wakeup message 220 from node $B_2$, node $B_1$ sends its data packet 260 to node $B_2$. After transmitting data, node $B_1$ performs the sleep scheduling.

In one embodiment, the BPN uses two timers, a sleep timer and a wakeup timer, to manage its sleep schedule. The sleep timer is used to schedule how long the node sleeps in a sleep interval and wakeup timer is used to schedule how long the node is awake in a sleep interval. A battery powered node determines its active period length and sleep period length dynamically. When the sleep timer expires, the battery powered node computes the active time value and starts the active timer. When active timer expires, the battery powered node computes the sleep time value and starts the sleep timer.

In some embodiments, the length of the sleep periods for the BPNs is limited and defined for a network. A battery powered node sets its sleep period length less than or equal to a maximal length defined for the network. Similarly, a minimal active period length also can be defined for a network. A battery powered node must set its active period length greater than or equal to the minimal length.

With the distributed sleep management model, mains powered nodes are always active. For example, the MPN 265 has an infinite active period 270. A node can send data packet to a mains powered node at any time. In some embodiments, the MPNs do not transmit wakeup message. Therefore, in some embodiments, the routing algorithm determines the type of the data node.

Some embodiments of the invention are based on additional realization that in some situations the decentralized sleep management can lead to increased collision rate of the transmitted data packets. In turn, the increased collision rate leads to retransmissions of the data packets, which increase the energy waste.

In contrast, the centralized sleep management can reduce the collision of data packets transmission, but can be not suitable for multi-hop heterogeneous network due to following reasons: (a) the synchronization of the network requires extra idle time for battery powered nodes to listen for synchronization packets; (b) the synchronization of multi-hop network requires extra energy to receive and relay synchronization packets; and (c) the centralized control node does not have sufficient information to make appropriate sleep schedule for data nodes in a multi-hop network. Therefore, a distributed sleep control model is preferred for multi-hop heterogeneous wireless network and there is a need to provide such a decentralized sleep management that reduces the likelihood of the packet collision.

Some embodiments are based on understanding that a cause for the increased collision rate lies at least in part in the distribution nature of the sleep management, which, in contrast with the centralized management, allows the nodes to determine times for their own transmission. For example, upon waking up, the BPN can start transmitting data packet stored or generated by the BPN during the sleep period. It is logical operation for the BPN, because the data packets self-generated by the BPN during its sleep period accumulate in the queue and can overflow the memory of the BPN. Similarly, when the neighboring nodes receive the wakeup signal from the BPN, the nodes can start to transmit their data packets to the BPN. It is also logical operation for the neighboring nodes, because the neighboring nodes need to transmit their data packets to go to the sleep period and to conserve energy. As a result, the burst of transmission can occur, which can lead to the packets collision.

Some embodiments of the invention addressed this problem by partitioning at least part of the active period of the BPN into a receiving (RX) period and a transmission (TX) period and transmitting the data packets during the TX period, e.g., after expiration of the RX period. In such a manner, the RX period is reserved for the incoming transmission. Such a reservation separate receiving and transmitting modes of the BPN and reduces the likelihood of collision.

Active Period Partition and Announcement

Some embodiments of the invention are based on recognition that partition of active period into receiving (RX) period and transmission (TX) period can save more energy. For example, when the BPN B 200 wakes up, the node transmits a wakeup message. Upon receiving the wakeup message, children of node B start to transmit their data packets to BPN 200. In this case, if BPN 200 also transmits its packets, collision could occur. Packet retransmission consumes extra energy.

FIG. 2C shows a schematic of partition of at least a part of the active period 210 for a battery powered node B 200. The partitioned part of the active period 210 is referred herein as an initial active period 211. To that end, the active period 210 includes an initial active period (AP) 211 and zero or more extended active period (AP) 214.

FIG. 2D shows schematic of partition of the initial active period (AP) 211, which is partitioned into a receiving (RX) period 212 and a transmission (TX) period 213. In RX period 212, node B 200 does not transmit its buffered data packets. Instead, node B listens for incoming data packets for relay. Node B transmits its buffered data packets in TX period 213. This partition can save more energy by avoiding packet collision.

A battery powered node B 200 uses wakeup message 220 and AP extension notification message 280 to announce its active period settings to neighbors. When node B wakes up from sleep, the node transmits a wakeup message 220. Upon extending its active period, node B may or may not transmit an AP extension notification message 280. If node B transmits an AP extension notification message 280, the extended AP 214 is used as RX period. Otherwise, extended AP 214 is used as TX period.

Figure 3A:
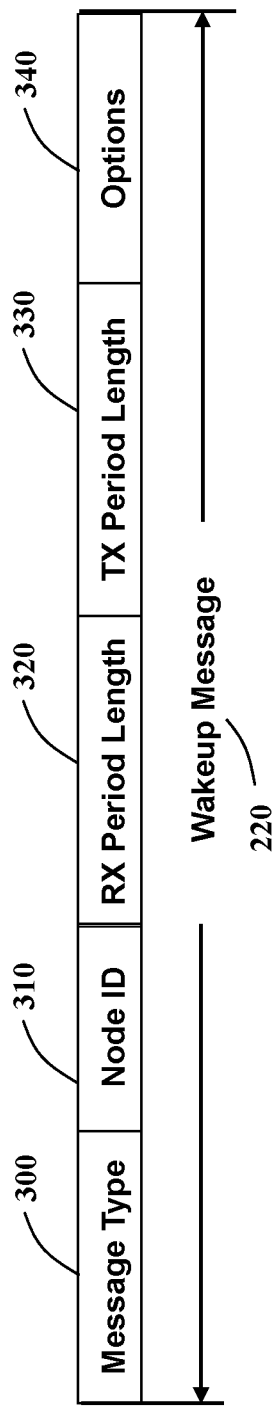
FIG. 3A is a structure of wakeup message used by battery powered nodes to announce active period configurations according to some embodiments of the invention.

FIG. 3A shows a schematic of wakeup message 220, which can include a message type field 300 to indicate type of the message, a node ID field 310 to indicate ID of the battery powered node that transmits the wakeup message, a RX period length field 320 to announce length of the time period the node will be receiving, a TX period length field 330 to indicate length of the time period the node will transmit buffered data packets, and options field 340 for any other information. The RX period starts at the time the node transmits the wakeup message and TX period starts at the end of RX period. If RX period length 320 equals to zero, then The TX period starts at the time the node transmits the wakeup message. The active period length equals to RX period length (|RXP|)+TX period length (|TXP|). If queue overflows, RX period length is 0, which means that node B starts active period with a TX period first. Otherwise, RX period length is greater than 0, which means that node B starts active period with a RX period first.

Figure 3B:
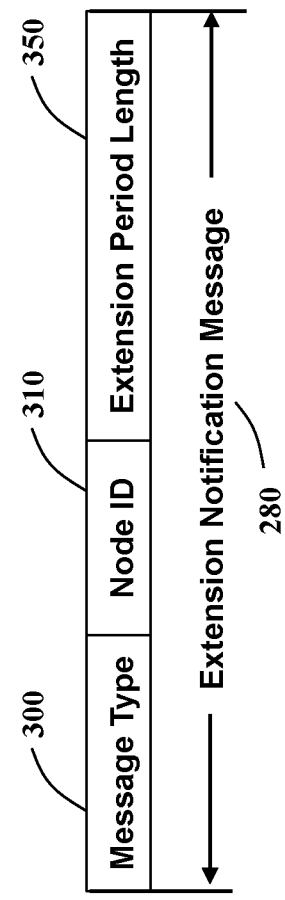
FIG. 3B is a structure of active period extension notification message used by battery powered nodes to announce the extension of the active period according to some embodiments of the invention.

FIG. 3B shows a schematic of active period extension notification message 280, which includes a message type field 300 to indicate type of the message, a node ID field 310 to indicate ID of the battery powered node that transmits the extension notification message, and an extension period length field 350 to indicate how long the active period is extended. The extended active period starts at the time the node transmits the extension notification message.

Figure 3C:
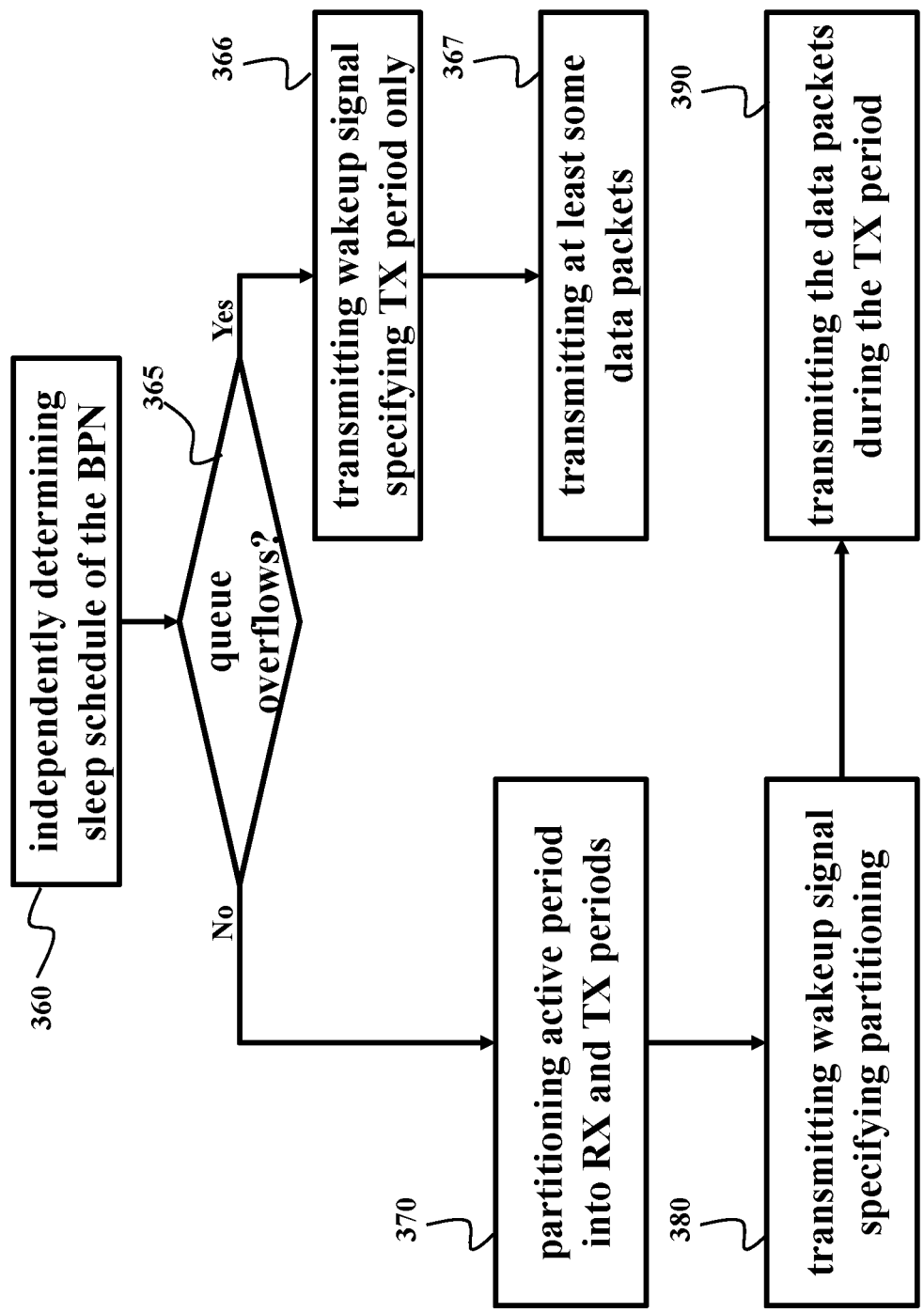
FIG. 3C is a block diagram of a computer-implemented method for managing a battery-powered node according to one embodiment of the invention.

FIG. 3C shows a block diagram of a computer-implemented method for managing a battery-powered node (BPN) according to one embodiment of the invention. The order and presence of the steps can vary for different implementations of the embodiment. The BPN is forming a multi-hop heterogeneous wireless network of nodes including data nodes and at least one sink node. The data nodes include battery-powered nodes (BPNs) and mains-powered nodes (MPNs). The method is implemented using a processor of the BPN executing instructions stored in a memory of the BPN. For example, the processor can perform the required computations of the method and/or cause other components of the BPN, such as a transceiver, to perform the required operations.

The method determines 360 a sleep schedule of the BPN independently from the sleep schedules of other data nodes in the network and independently from commands transmitted by the sink node to form an active period of BPN when a transceiver of the BPN is switched ON and to form a sleep period of BPN when the transceiver is switched OFF. The method also tests 365 a number of the data packets in the queue at the beginning of each active period to determine if the queue overflows, transmits 366 a wakeup signal specifies a transmission (TX) period only and transmits 367 at least some data packets stored in a queue of the BPN if the queue overflows. For example, the method can transmit only one or some data packets from the queue to free some space for the incoming packets. Additionally or alternatively, the method can transmit all data packets from the queue.

If queue does not overflow, the method partitions 370 at least part of the active period, e.g., the initial AP, into a receiving (RX) period and a transmission (TX) period and transmits 380 a wakeup signal specifying the partitioning of the part of the active period to other nodes in the network. During the RX period, the BPN does not transmit data packets and only listens for the incoming packets. For example, when the RX period is followed by the TX period, the method transmits the data packets during the TX period after expiration of the RX period.

Active Period Length and Sleep Period Length Computation

In some embodiments, the length of the sleep periods for the battery powered nodes is limited and a maximum sleep period length $|SP|_{max}$ is defined for a network. A battery powered node sets the length of its sleep period less than or equal to $|SP|_{max}$. This prevents battery powered nodes from sleeping forever. Similarly, a minimum active period length $|AP|_{min}$ can also be defined for a network. A battery powered node sets a length of its active period greater than or equal to $|AP|_{min}$. This also prevents battery node from sleeping forever.

With the distributed sleep management, mains powered nodes are always active. Therefore, a mains powered node has an active period with infinite length. For example, the mains powered node 265 has an infinite active period 270. A node can send data packet to a mains powered node at any time.

In various embodiments of the invention, the processor of the battery powered node determines the sleep schedule independently from the sleep schedule of other nodes in the network and independently from any commands transmitted by the sink node. For example, the processor of the battery powered node determines the sleep schedules based on information internal to the battery powered node using activities of the network observed by the battery powered node.

In one embodiment of the invention, if a battery powered node B 200 has no data to transmit, then the node sets its active period length ($|AP|$) to $|AP|_{min}$, i.e., $|AP|=|AP|_{min}$, sets its sleep period length ($|SP|$) to $|SP|_{max}$, and therefore, schedules periodic sleep intervals. For example, nodes $B_2$ 230 and $B_3$ 235 have no data to transmit, and therefore, they perform periodic sleep scheduling. However, if a battery powered node has data packets to transmit, its active period length $|AP|$ and sleep period length $|SP|$ can vary.

The battery powered node B 200 dynamically determines the lengths of active period 210 and sleep period 215, i.e., the schedule of the active and sleep periods does not have to be periodic. For example, a sleep period 218 is shorter than sleep period 215. Node B determines active period length ($|AP|$) and sleep period length ($|SP|$) based on amount of data traffic.

Figure 4A:
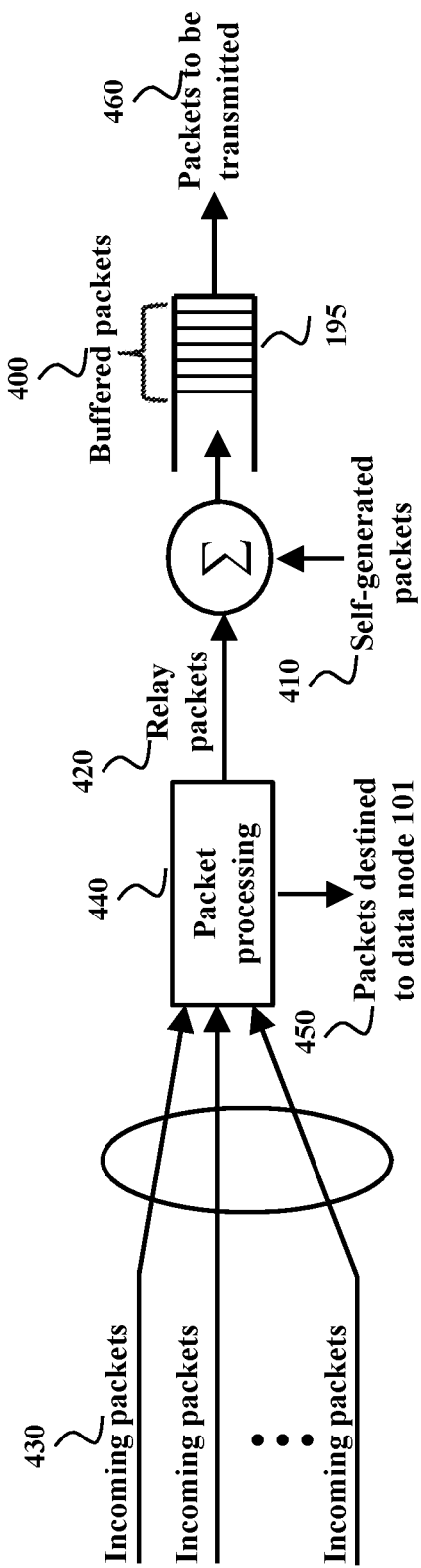
FIG. 4A is a schematic of data traffic model of a data node in the network of FIG. 1A.

FIG. 4A shows schematic of data traffic model of a data node. A data node 101 has buffered packets 400 in queue 195. The data node also generates its own data packets 410. The data node also receives data packets 430 from its children. The incoming packets 430 are processed 440 by processor 170, which divides incoming packets into packets 430 into packets 450 destined to the node 101 and relay packets 420. The self-generated packets 410 and relay packets 420 are pushed into queue 195 before being transmitted. The processor 170 pops packets 460 from queue 195 to transmit.

Figure 4B:
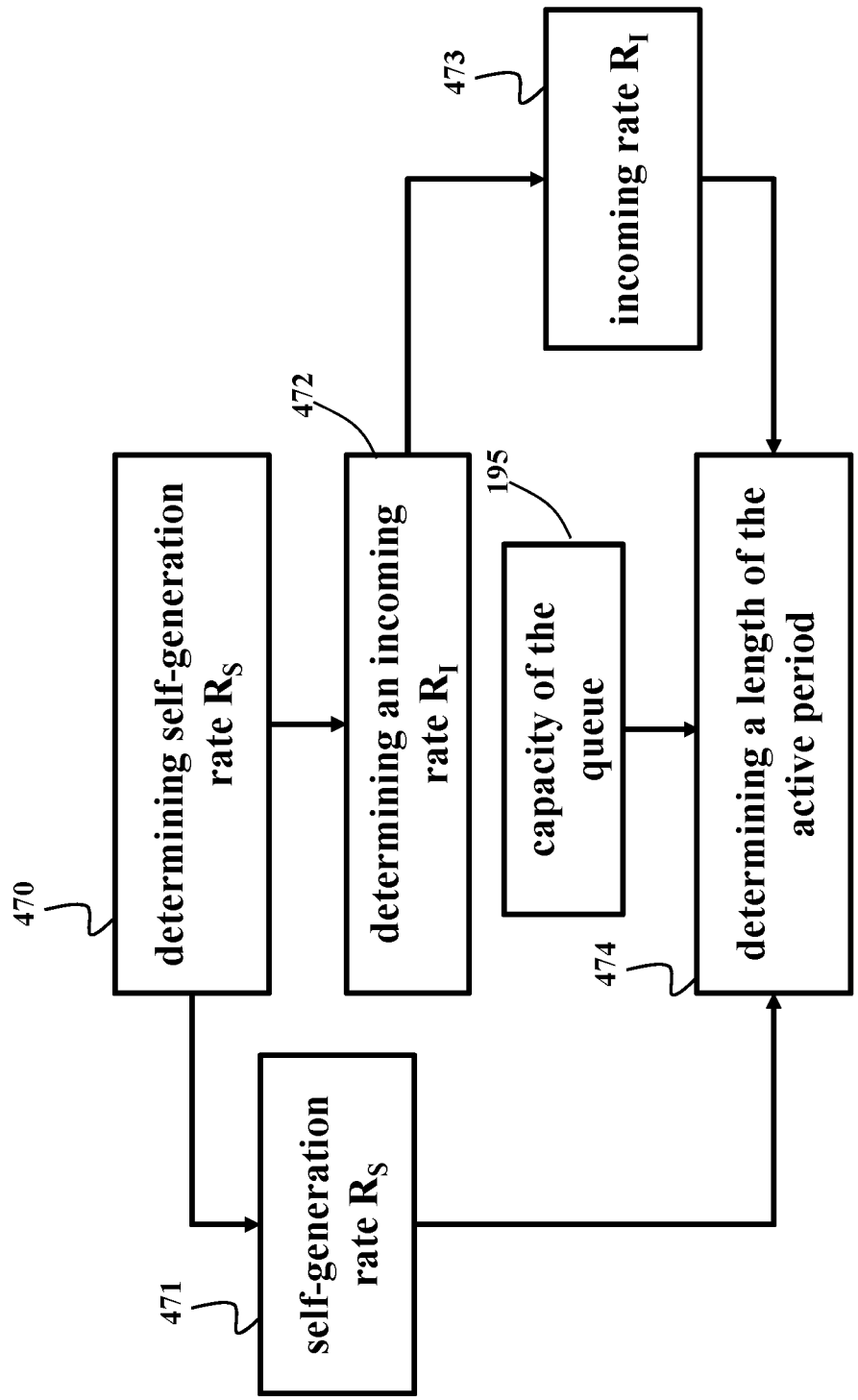
FIG. 4B is a block diagram of a method for determining a length of the active period of the battery-powered node according to one embodiment of the invention.

FIG. 4B shows a block diagram of a method for determining a length of the active period of the BPN according to one embodiment of the invention. The method determines 470 a self-generation rate 471 of generating new data packets by the BPN and determines 472 an incoming rate 473 of receiving new data packets by the BPN. Next, the method determines 474 a length of the active period based on a number 400 of the data packets in the queue, the self-generation rate, the incoming rate, and queue capacity 195.

Figure 4C:
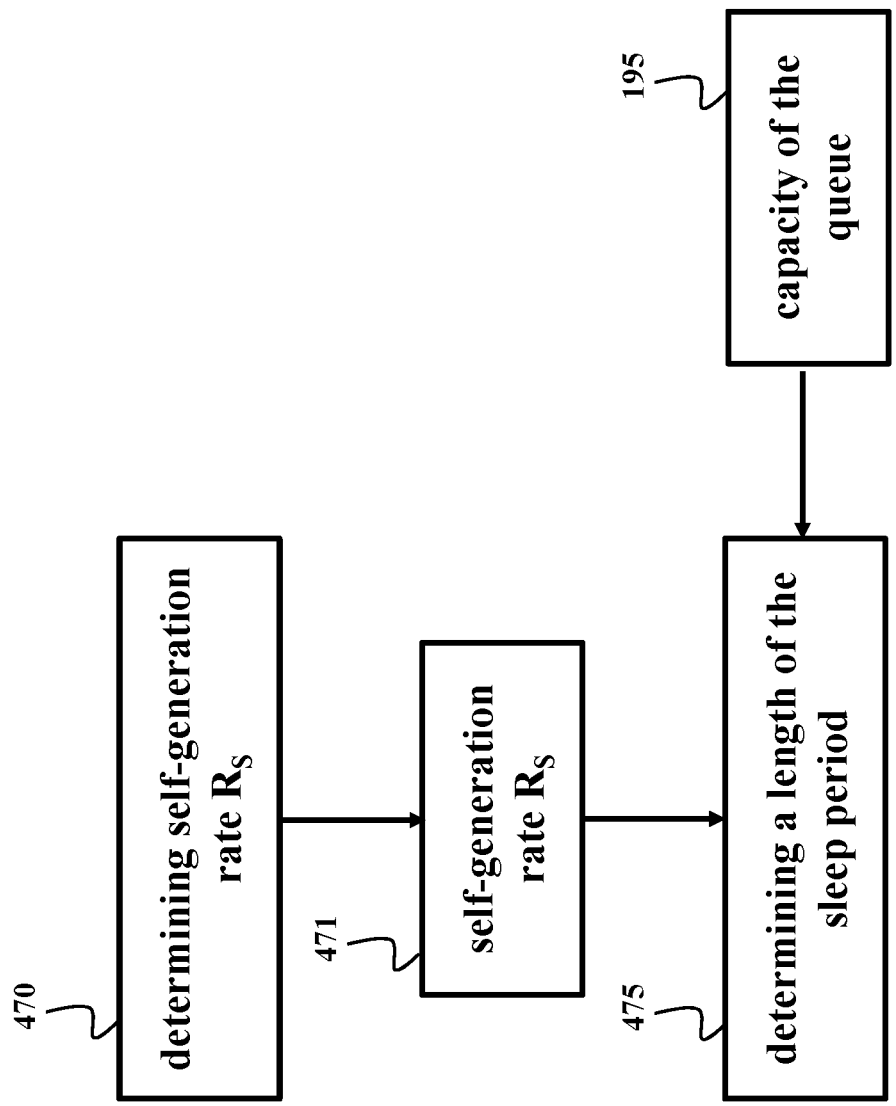
FIG. 4C is a block diagram of a method for determining a length of the sleep period of the battery-powered node according to one embodiment of the invention.

FIG. 4C shows a block diagram of a method for determining a length of the sleep period of the BPN according to one embodiment of the invention. Similarly to the approach of FIG. 4B, this method determines a self-generation rate 471 and determines 475 a length of the sleep period based on a number 400 of the data packets in the queue, a capacity of the queue 195, and the self-generation rate 471.

Figure 4D:
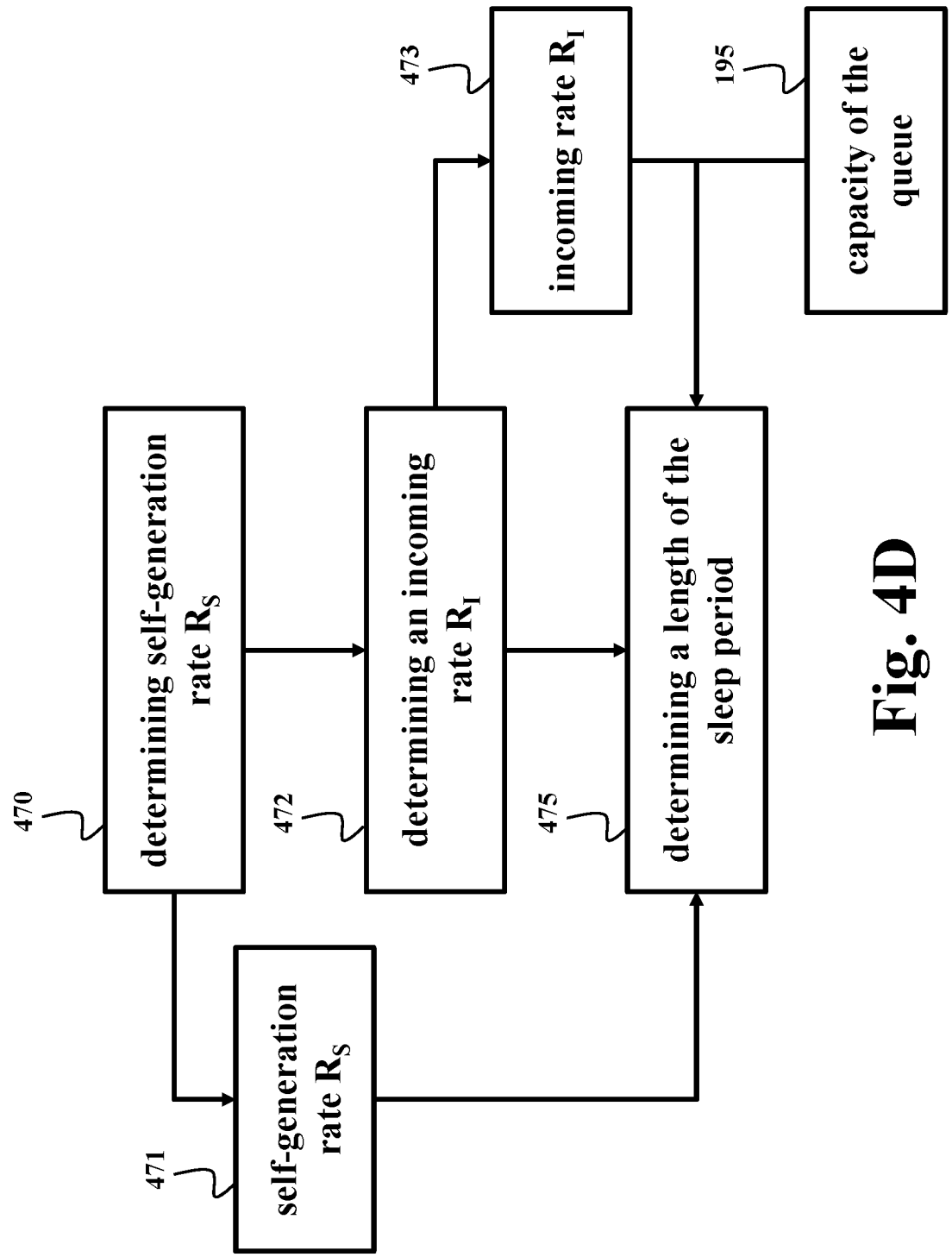
FIG. 4D is a block diagram of a method for determining a length of the sleep period of the battery-powered node according to another embodiment of the invention.

FIG. 4D shows a block diagram of a method for determining a length of the sleep period of the BPN according to another embodiment of the invention. This embodiment is based on recognition that despite the fact that the BPN goes to sleep and cannot receive the incoming data packets, there is still a need to account for the incoming rate 473 in determining the sleep period. This is because while sleeping, the incoming data packets are accumulated by the neighboring nodes, and as soon as the BPN wakes up, the BPN starts to receive all those accumulated data packets. To that end, one embodiment of the invention reduces the sleep period to accommodate for a burst of the incoming data packets.

The processor of the BPN can access a number of the data packets in the queue, and also knows its data packet generation rate $R_S$. Therefore, the BPN can compute a number of self-generated packets (NoSP) for a given time period. However, the length of the active period needs to take into account a number of incoming data packets (NoIP). To that end, in one embodiment, the BPN determines incoming packet arriving rate $R_I$ based on one or combination of a hop count of the BPN and a number of children nodes of the BPN.

Incoming Data Packet Arriving Rate $R_I$ Computation

One embodiment of the invention, to measure $R_I$, considers a wireless network with H hops, i.e., the maximum hop count in the network is H. Assume a node with hop count h (h=1, 2, . . . , H−1) has $C_h$ children, $P_h$ parents and selects h−1 hop nodes as parents.

In one embodiment, incoming packet arriving rate $R_I$ is determined based on one or combination of probability of a parent being active (PoA), probability of queue overflow (PoQ), and link quality. These three metrics can be used in any combination or individually. For a mains powered node, PoA is equal to one. For a battery powered node, PoA is equal to |AP|/(|AP|+|SP|). PoQ equals to the number of packets deleted due to full queue divided by the number of packets pushed into queue. The expected number of transmission (ETX) can be used as link quality measurement.

For example, one embodiment $R_I$ computation is based on PoA, PoQ and ETX. To compute $R_I$, the probability of a node sending a data packet to a battery powered parent and probability of a node sending a data packet to a mains powered parent are first computed.

A packet can be successfully delivered from a child C to a parent P only if packet is not deleted by child C due to queue overflow and packet is not dropped during delivery due to link quality from C to P. Using PoQ and ETX, the probability of successful packet delivery rate from a child C to a parent P is given by $$PoS(C, P) = \frac{1 - PoQ(C)}{ETX(C, P)} \quad (1)$$

Let $P_i^{h-1}$ (i=1, 2, . . . , $P_h$) be parents of a child C with hop count h (mains powered node or battery powered node) and $PoA(P_i^{h-1})$ be probability of parent $P_i^{h-1}$ being active. Assume child C has $BP_h$ battery powered parents and $P_h - BP_h$ mains powered parents. Child C can send a data packet to a battery powered parent only if the parent is active. Therefore, the probability of child C sending a data packet to a battery powered parent $BP^{h-1}$ is $$PoC2B(C, BP^{h-1}) = \frac{PoA(BP^{h-1}) * PoS(C, BP^{h-1})}{\sum_{i=1}^{BP_h} PoA(P_i^{h-1}) * PoS(C, P_i^{h-1}) + \sum_{i=BP_h+1}^{P_h} PoS(C, P_i^{h-1})} \quad (2)$$

Even though a mains powered parent is always active, a child C can send a data packet to any active parent. Therefore, the probability of child C sending a data packet to a mains powered parent $MP^{h-1}$ is $$PoC2M(C, MP^{h-1}) = \frac{PoS(C, MP^{h-1})}{\sum_{i=1}^{BP_h} PoA(P_i^{h-1}) * PoS(C, P_i^{h-1}) + \sum_{i=BP_h+1}^{P_h} PoS(C, P_i^{h-1})} \quad (3)$$

$R_I$ is computed by using equations (2) and (3).

In a network with the maximum hop count H, a node $C^H$ with hop count H is leaf node and has no incoming packet, i.e., $R_I(C^H)=0$.

A node with hop count H−1 has $C_{H-1}$ children $CH_i^H$ (i=1, 2, . . . , $C_{H-1}$). Let $R_S(C_i^H)$ be data packet generation rate of child $C_i^H$. For a battery powered node $BP^{H-1}$ with hop count H−1, the incoming packet arriving rate is $$R_I(BP^{H-1}) = \sum_{i=1}^{C_{H-1}} R_S(C_i^H) * PoC2B(C_i^H, BP^{H-1}) \quad (4)$$

and for a mains powered node $MP^{H-1}$ with hop count H−1, the incoming packet arriving rate is $$R_I(MP^{H-1}) = \sum_{i=1}^{C_{H-1}} R_S(C_i^H) * PoC2M(C_i^H, MP^{H-1}) \quad (5)$$

For a battery powered node $BP^h$ with hop count h (h=1, 2, . . . , H−2), $R_I$ can be computed via a recursive approach by using (4) and (5) as $$R_I(BP^h) = \sum_{i=1}^{C_h} R_S(C_i^{h+1}) * PoC2B(C_i^{h+1}, BP^h) + \sum_{i=LC_{h+1}+1}^{LC_{h+1}+BRC_{h+1}} R_I(C_i^{h+1}) * R_S(C_i^{h+1}) * PoC2B(C_i^{h+1}, BP^h) + \sum_{i=LC_{h+1}+BRC_{h+1}+1}^{C_h} R_I(C_i^{h+1}) * R_S(C_i^{h+1}) * PoC2M(C_i^{h+1}, BP^h) \quad (6)$$

where $LC_{h+1}$ is number of leaf children of the node $BP^h$, $BRC_{h+1}$ is number of battery powered router children of the node $BP^h$.

One embodiment determines the incoming rate $R_I$ based on PoA. In a network with the maximum hop count H, a node $C^H$ with hop count H is leaf node and has no incoming packet, i.e., $R_I(C^H)=0$. Assume battery powered nodes with same hop count have same active probability and all data nodes have same data packet generation rate $R_S$, then incoming data packet arriving rate for a battery powered node $BP^h$ with hop count h (h=1, 2, . . . , H−1) is given by $$R_I(BP^h) = \quad (7)$$

$$R_S * \left[ C_h + \sum_{i=h+1}^{H-1} C_i \prod_{j=h+1}^{i} (BRC_j * PoC2B_{j+1} + MRC_j * PoC2M_{j+1}) \right] * PoC2B_{h+1}$$

-continued where $PoC2B_{j+1} = \dfrac{PoA_j}{BP_{j+1} * PoA_j + P_{j+1} - BP_{j+1}}$ and $PoC2M_{j+1} = \dfrac{1}{BP_{j+1} * PoA_j + P_{j+1} - BP_{j+1}}$, $PoA_j$ is the probability of j hop battery powered nodes being active.

Initial Active Period (AP) Length Computation

As shown in FIG. 2C, an active period includes initial AP 211 and extended AP 214. A default way is to set initial AP length as $|AP|=|AP|_{min}$. However, this setting does not consider amount of data traffic and therefore, can be impractical for multi-hop heterogeneous wireless networks, where some nodes have more data packets to relay and other nodes have less data packets to relay. For example, in FIG. 1A, nodes closer to sink node relay more data packets and away from sink node relay less data packets.

As shown in FIG. 4A, a battery powered node has three data packet sources to transmit when it wakes up: buffered data packets 400, self-generated data packets 410 and incoming relay data packets 420. In one embodiment, the processor 170 determines the initial AP length based on number of the buffered packets (NoBP), number of self-generated packets (BoSP) and number of incoming packets (NoIP) for relay.

Let QC be queue capacity of a battery powered node, i.e., the maximum number of packets can be buffered. Let $R_S$ be data packet self-generation rate, $R_I$ be data packet incoming rate and $R_T$ be data packet transmission rate at network layer. If $R_S \geq R_T$, a battery powered node cannot sleep in order to prevent packet dropping. This is a case in which application has to determine either allowing sleep or not allowing sleep to prevent packet dropping. Following methods for active period length computation are provided for the case $R_S < R_T$.

A combination of historic measurement and prediction is used to compute initial AP length.

Predicted RX Period Length $|RXP|_P$:

If queue is full, i.e., NoBP=QC, $|RXP|_P=0$.

Otherwise, queue is not full, i.e., NoBP<QC. In RX period, there are two sources of packets being pushed into queue: self-generated packets and incoming packets. Therefore, $|RXP|_P$ is set to the time when the queue gets full, i.e., $|RXP|_P=(QC-NoBP)/(R_S+R_I)$. However, if $|RXP|_P>|RXP|_{TH}$, then set $|RXP|_P=|RXP|_{TH}$, where $|RXP|_{TH}$ is a threshold to prevent the battery powered node from waiting long time to get queue full. This case occurs if data packet self-generation rate $R_S$ and data packet incoming rate $R_I$ are small.

Predicted TX Period Length $|TXP|_P$:

In TX period, only self-generated data packets are pushed into queue. So, $|TXP|_P$ is set to the time when the queue becomes empty, i.e., $|TXP|_P=NoBP/(R_T-R_S)$. However, if $|TXP|_P>|TXP|_{TH}$, set $|TXP|_P=|TXP|_{TH}$, where $|TXP|_{TH}$ is a threshold to prevent the battery powered node from taking long time to empty its queue. This case occurs if the battery powered node has no active parent to receive the packets.

With predicted $|RXP|_P$ and $|TXP|_P$, the predicted initial AP length $|AP|_P$ is given by $|AP|_P=|RXP|_P+|TXP|_P$.

Let $|AP|_H$ be the initial AP length in previous sleep interval, i.e., $|AP|_H=|RXP|_H+|TXP|_H$. The initial AP length for current sleep interval is computed as $$|AP|=\alpha*|AP|_H+(1-\alpha)*|AP|_P \qquad (8)$$

where $0 \leq \alpha \leq 1$ is a parameter to weight $|AP|_H$ and $|AP|_P$ such that if $|AP|_H$ is more accurate, i.e., less AP extensions, $\alpha$ is set to a larger value. Otherwise, $\alpha$ is set to a smaller value. For example, if $\alpha=1$, then $|AP|=|AP|_H$, i.e., historic initial AP length is used, and if $\alpha=0$, then $|AP|=|AP|_P$, i.e., the predicted initial AP length is used.

Extended Active Period Length Computation

A queue threshold $Q_{TH}$ is defined to indicate how full the queue is. If remaining space of the queue is greater than $Q_{TH}$, i.e., QC−NoBP>$Q_{TH}$, the queue is said to be not near full. Otherwise, the queue is said to be near full.

At the end of active period, a battery powered node can extend active period if its queue is near full. To extend its active period, the node needs to determine the active period extension length $|APE|$. For example, one embodiment uses a deterministic method to compute the extension length $|APE|$.

Figures 5A, 5B:
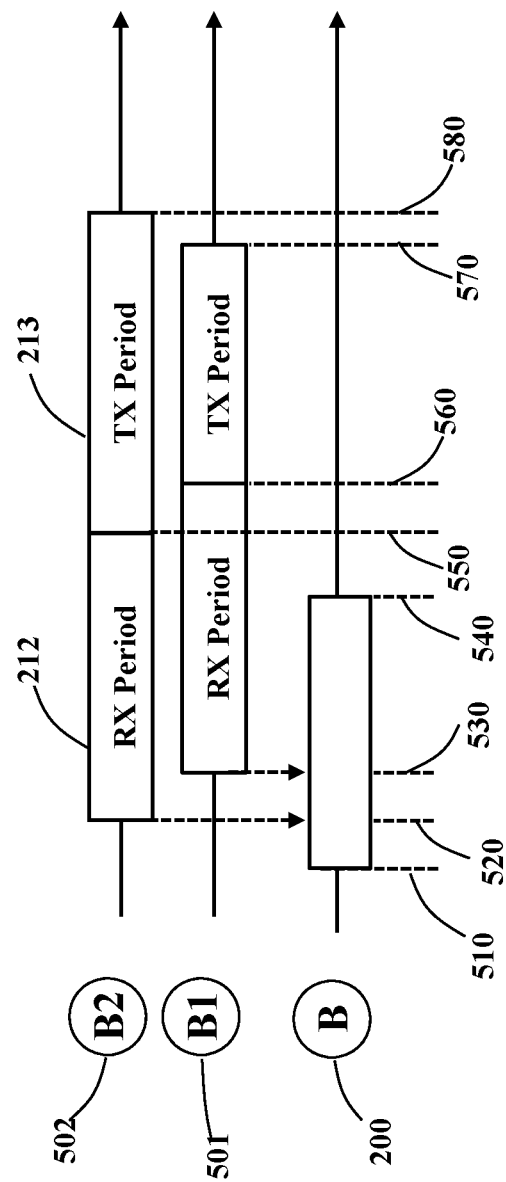
FIG. 5A is a schematic of a format of the parent active period table maintained by the data node according to some embodiments of the invention.
FIG. 5B is a schematic of a method performed by a data node to determine the latest parent receiving ending time (LPRET) and the latest parent transmission ending time (LPTET) according to some embodiments of the invention.

FIG. 5A shows a schematic of a parent active period table maintained according to one embodiment of the invention. With distributed sleep management, each data node (battery powered or mains powered) maintains a parent active period table (PAPT) 500. An entry in PAPT 500 includes parent ID (PID), parent power source type (PST), parent RX period ending time (RXET) and parent TX period ending time (TXET). For example, for a mains powered parent 10, RXET and TXET are set to infinite. For battery powered parents 20 and 30, RXET and TXET are set to values obtained in wakeup message 220 or active period extension notification message 280. The PAPT table 500 is used by a data node to select the best parent to send data packet at a given time.

Using PAPT 500, a battery powered data node can determine the latest parent RX ending time (LPRET) and the latest parent TX ending time (LPTET) to compute $|APE|$.

FIG. 5B shows an example of the LPRET and the LPTET determination by battery powered data node B 200, which has two battery powered parents B1 501 and B2 502. Node B 200 wakes up at time 510 and its initial AP ends at time 540. At time 520, node B receives parent B2's wakeup message that shows RX period 212 ends at time 550 and TX period 213 ends at time 580. At time 530, node B receives parent B1's wakeup message that shows RX period ends at time 560 and TX period ends at time 570. Therefore, node B determines that the LPRET is time 560 and the LPTET is time 580. At initial AP ending time 540, node B can extend its AP if queue is near full because both parents are in their RX period.

In one implementation, the computation of $|APE|$ is divided into three cases. In first case, the battery powered node B 200 has at least one parent in RX period 212. In this case, the node B tries to transmit as many packets as possible in parent's RX period. Therefore, node B extends AP such that either all buffered packets are transmitted or no parent is in RX period:

$$|APE| = \min\left\{\dfrac{NoBP*L_P}{R_D}, LPRET - NOW\right\}$$

where LP is data packet length, $R_D$ is physical layer data rate, and NOW is the time node B computing $|APE|$.

In second case, the battery powered node B has at one parent in transmission period. In this case, the node B tries to transmit as many packets as the maximum number of allowed packet (MNoAP) packet transmissions in parent's TX period. Therefore, node B extends AP such that either the maximum number of allowed packets is transmitted or no parent is active:

$$|APE| = \min\left\{\frac{MNoAP * L_P}{R_D}, LPTET - NOW\right\}$$

In third case, the battery powered node B has no active parent. In this case, |APE| is computed based on number of buffered packets (NoBP), the percent of mains powered nodes (PoMN), hop count (h) of the node B, number of parents waked (NoPW) up in node b's active period and number of parent (NoP). For example, |APE| can be determined according to $$|APE| = \frac{NoBP}{QC} * (1 - PoMN) * \left(1 - \frac{h}{H}\right) * \left(1 - \frac{NoPW}{NoP}\right) * |AP|_{min}.$$

Sleep Period Length Computation

At the end of active period, a battery powered node goes to sleep if its queue is not near full. In some embodiments of the invention, before the node goes to sleep, the node determines the length of the sleep period length |SP|.

In the sleep mode, a battery powered node does not receive any packets and does not transmit any packet. Only self-generated data packets are pushed into queue. So, the battery powered node can sleep until to its queue gets full. Therefore, sleep period length |SP| is set to $$|SP| = \frac{QC - NoBP}{R_S} \quad (9)$$

If $|SP|>|SP|_{max}$, set $|SP|=|SP|_{max}$.

In one embodiment, the battery powered node computes active period (AP) length proportional to total number of the data packets to be transmitted, which includes buffered packets 400, self-generated packets 410 and relay packets 420. The length of the sleep period (SP) is inversely proportional to data packet self-generation rate. The AP length computation can also be based on observed network conditions since number of incoming relay packets depends on hop count, number of parent, number of children, probability of parent being active, link quality.

Sleep Interval Control

In one embodiment, the battery powered node B 200 uses three timers to manage its sleep and wakeup schedules as well as transmission schedule: wakeup timer, sleep timer and TX timer. Before going to sleep, the node B sets wakeup timer. When wakeup timer expires, node B wakes up. Upon waking up, node B sets sleep timer. When sleep timer expires, node B goes to sleep. When node B wakes up, the node also sets TX timer. When TX timer expires, node B starts its TX period and transmits the buffered data packets.

Figure 6A:
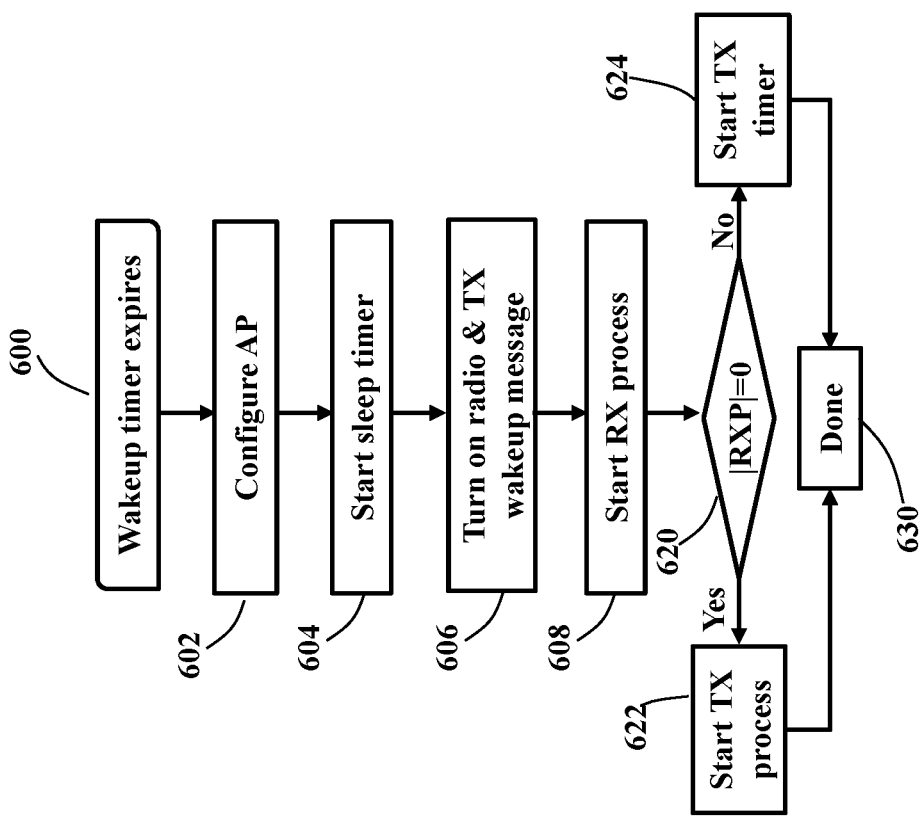
FIG. 6A is a block diagram of the method performed by the battery powered node upon waking up according to some embodiments of the invention.

FIG. 6A shows schematic of wakeup timer process of the node B according to one embodiment. When wakeup timer expires 600, node B first configures 602 its initial active period (AP), i.e., computes RX period length and TX period length, then starts sleep timer 604 by setting timer value to initial AP length, i.e., |RX|+|TXP|. Node B then turns on radio and transmits a wakeup message 220 to announce its active period settings. After transmitting wakeup message, node B starts 608 RX process. If 620 |RXP|=0, i.e., no RX period is scheduled, node B starts 622 TX process and finishes 630 wakeup timer process. Otherwise, node B starts TX timer 624 by setting timer value to |RXP| and finishes wakeup timer process 630.

Figures 6B, 6C:
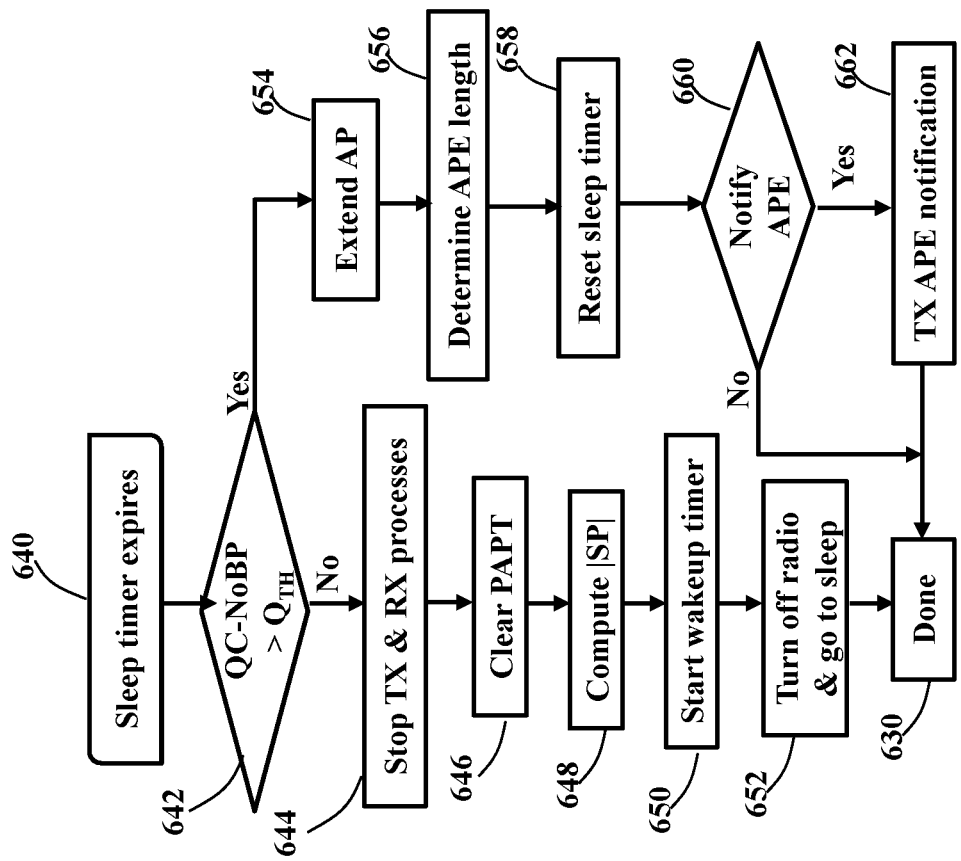
FIG. 6B is a block diagram of the method performed by the battery powered node before going sleep according to some embodiments of the invention.
FIG. 6C is a block diagram of the method performed by the battery powered node to start data transmission according to some embodiments of the invention.

FIG. 6B shows schematic of sleep timer process of the node B according to one embodiment. When sleep timer expires 640, node B determines 642 if its queue is near full. If the queue is not near full, node B stops 644 TX and RX processes, clears parent active period table (PAPT) 646, computes 648 sleep period length (|SP|), starts 650 wakeup timer by setting timer value to |SP|, turns off radio and goes to sleep 652. Node B finishes sleep process 630. If the queue is near full, node B does not go to sleep, instead it extends 654 its active period. To extend active period, node B 656 computes active period extension (APE) length and resets sleep timer 658 with timer value |APE|. Node B then 660 determines if it announces the active period extension to neighbors. If node B has no active parent (i.e., node B is going to idle waiting) and queue is not completely full, node B 662 transmits active period extension notification message 280 so that its children may send packets to it. Otherwise, node B has active parent, in this case, node B does not announce active period extension and continues transmitting its buffered data packets.

FIG. 6C shows schematic of the TX timer process according to one embodiment. When TX timer expires 664, node B starts TX process 666.

In one embodiment, the battery powered node uses three timers, a wakeup timer, a sleep timer and a TX timer, to manage its sleep and active schedules as well as transmission schedule. The wakeup timer is used to schedule how long the node is awake in a sleep interval, sleep timer is used to schedule how long the node sleeps in a sleep interval and TX timer is used to schedule when the node starts data packet transmission in a sleep interval. A battery powered node determines its active period length and sleep period length dynamically. When the sleep timer expires, the battery powered node computes the active time value and starts the active timer. When active timer expires, the battery powered node computes the sleep time value and starts the sleep timer.

In one embodiment, at the end of initial AP or an extended AP, battery powered node B dynamically determines if it is necessary to extend its AP. The AP extension process continues until node B determines no more extension is needed or a maximum number of extensions have reached. In one embodiment of invention, mains powered node starts RX and TX processes when it powers up.

Receiving (RX) and Transmission (TX) Control in Active Period

The battery powered nodes partition their active period into RX period 212 and TX period 213. According to some principles of the embodiments, it is desirable for the children of a battery powered parent not to send packets to the parent during the parent's TX period. Therefore, RX and TX control needs cooperative operations from both parent and children. In other words, a child (mains powered or battery powered) needs to obey parent's active period (AP) configurations.

A data Node (Mains Powered or Battery Powered) Uses Four Flags to Control RX and TX Activities:

Parent RX flag (PRF): when this flag is on, at least one parent is in RX period. Mains powered parent is considered to be always in RX period.

Parent TX flag (PTF): when this flag is on, at least one parent is in TX period. Mains powered parent is considered to be always in TX period. This flag can be turned on only if PRF flag is off.

Neighbor data flag (NDF): when this flag is on, a data node is not sure if any parent is active, but overhears at least one neighbor transmitting data packet to at least one of the data node's battery powered parent. In this case, the receiving parent is mostly in RX period. This flag can be turned on only if both PRF and PTF are off.

Parent data flag (PDF): when this flag is on, a data node is not sure if any parent is active, but overhears at least one battery parent transmitting data packet. In this case, transmitting parent is in TX period. This flag can be turned on only if PRF, PTF and NDF are off.

A Data Node (Mains Powered or Battery Powered) also Uses Two Timers in RX and TX Control Process:

Parent RX ending (PRE) timer: when this timer expires, all parent's RX periods end. Parents are either in TX period or in sleep period.

Parent TX ending (PRE) timer: when this time expires, all parent's TX periods end. Parents are in sleep.

Figure 7A:
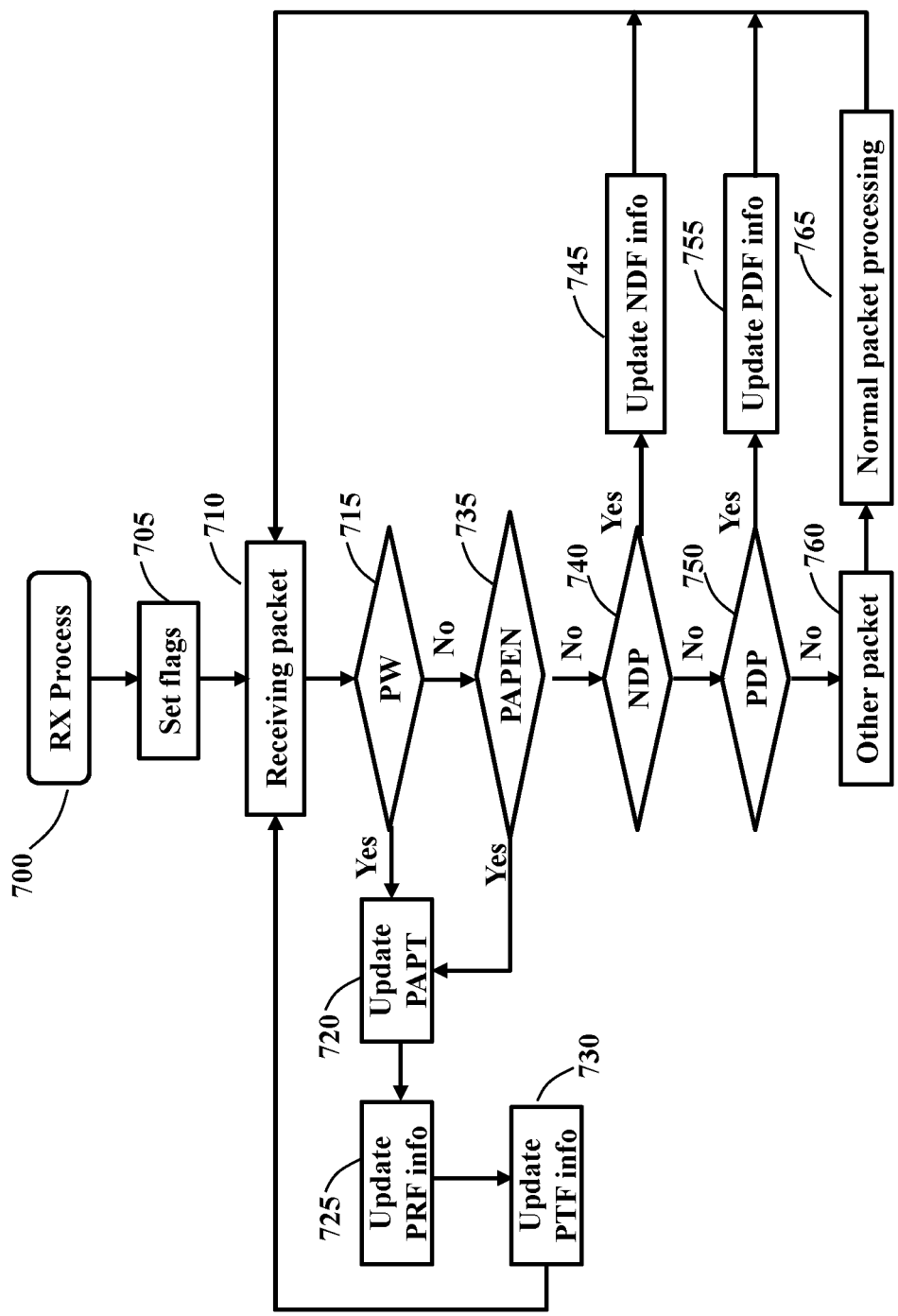
FIG. 7A is a block diagram of receiving method of the data node according to some embodiments of the invention.

FIG. 7A shows block diagram of RX process 700 of a data node (mains powered or battery powered) according to one embodiment of the invention. The data node first sets 705 flags. If data node has any mains powered parent, it sets PRF=1, PTF=0, NDF=0 and PDF=0. It also sets the LPRET to infinite and the LPTET to infinite Otherwise, the data node sets PRF=0, PTF=0, NDF=0 and PDF=0. It also sets the LPRET to NOW and the LPTET to NOW. Once data node receives 710 a packet, it checks type of the packet.

If the packet is a parent wakeup (PW) message 715, the data node updates 720 PAPT table by adding an entry or updating existing entry for this battery powered parent. The RXET is set to |RXP| and the TXET is set to |RX|+|TXP|. After updating PAPT table, the data node updates PRF information 725. If |RXP|>0 and PRF=0, the data node sets PRF=1, sets LPRET=|RXP| and LPTET=|RXP|+|TXP|, and starts PRE timer by setting timer value to |RXP|. Otherwise, if |RXP|>0 and PRF=1, if LPRET<|RXP|, the data node sets LPRET=|RXP| and resets PRE timer with timer value |RXP|, if LPTET<|RXP|+|TXP|, the data node sets LPTET=|RXP|+|TXP|. The data node then updates PTF information 730 with following three cases: (1) PRF=1 and |TXP|>0 and LPTET<|RXP|+|TXP|, in this case, the data node sets LPTET=|RXP|+|TXP|; (2) PRF=0 and |TXP|>0 and PTF=0, in this case, |RXP| must be zero, the data node sets PTF=1, starts PTE timer with timer value LPTET−NOW if LPTET≥|TXP| or starts PTE timer with timer value |TXP| and sets LPTET=|TXP| if LPTET<|TXP|; (3) PRF=0 and |TXP|>0 and PTF=1, in this case, |RXP| must also be zero, the data node resets PTE timer with timer value |TXP| and sets LPTET=|TXP| if LPTET<|TXP|.

If the packet is a parent active period extension notification (PAPEN) message 735, the dada node only updates PAPT table and PRF flag information since a battery powered node announces AP extension only in idle waiting mode, i.e., in a PAPEN message, |RXP|>0 and |TXP|=0. The data node updates 720 PAPT table by adding an entry or updating existing entry for this battery powered parent. The RXET is set to |RXP| and the TXET is also set to |RXP|. After updating PAPT table, the data node updates PRF information 725. If PRF=0, the data node sets PRF=1, the LPRET=|RXP| and starts PRE timer by setting timer value to |RXP|. Otherwise, if PRF=1 and LPRET<|RXP|, the data node sets the LPRET=|RXP| and resets PRE timer with timer value |RXP|.

If the packet is a data packet transmitted by a neighbor to a parent of the data node, i.e., neighbor data packet (NDP) 740, the data node updates 745 NDF flag information if both PRF and PTF are off. In this case, the data node sets NDF=1, sets overheard data RX parent (ODRP) to ID of the parent that is destination of data packet transmitted by the neighbor and sets overheard neighbor TX time (ONTXT) to NOW.

If the packet is a data packet transmitted by a parent, i.e., parent data packet (PDP) 750, the data node updates 745 PDF flag information if PRF, PTF and NDP are off. In this case, the data node sets PDF=1, sets overheard data TX parent (ODTP) to ID of the parent that transmitted data packet and sets overheard parent TX time (OPTXT) to NOW.

If the packet is any other packet 760, the data node performs normal packet processing 765. Once packet processing is complete, RX process returns receiving packet state 710.

FIG. 7B shows block diagram of PRE timer process according to one embodiment of the invention. When PRE timer expires 770, the data node 775 sets PRF=0. If LPTET>NOW 780, the data node 785 sets PTF=1 and starts PTE timer 788 with timer value LPTET−NOW.

FIG. 7C shows block diagram of PTE timer process. When PTE timer expires 795, the data node sets PTF=0.

Figure 8:
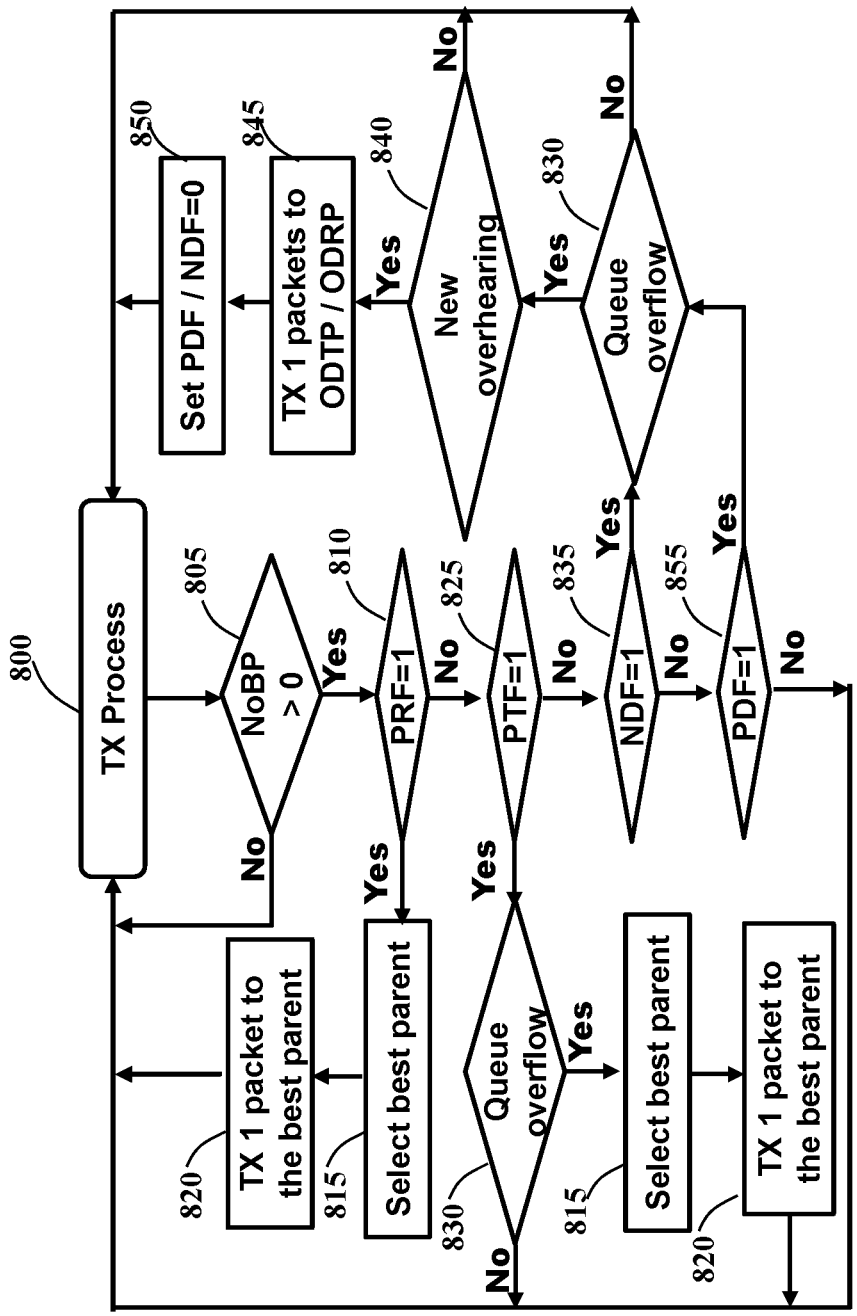
FIG. 8 is a block diagram of transmission method of the data node according to some embodiments of the invention.

FIG. 8 shows a block diagram of TX process of a data node according to one embodiment of the invention. Once the TX process starts 800, the dada node first checks if there is any buffered data packet in its queue 805. If no, the TX process goes to standby mode. If yes, the data node checks if parent RX flag (PRF) is on 810. If yes, the data node selects the best parent 815 and sends a data packet to the best parent 820. After packet transmission, the TX process loops back the start 800. If the PRF is off, the data node checks if the parent TX flag (PTF) is on 825. If yes, data node checks if queue overflow will occur 830. If no, the TX process loops back to the start 800. If yes, the data node selects the best parent 815 and sends a data packet to the best parent 820. If both PRF and PTF are off, the data node checks if the neighbor data flag (NDF) is on 835. If no, the TX process loops back to the start 800. If yes, the data checks if queue overflow will occur 830. If no, the TX process loops back to the start 800. If queue will overflow 840, the data node checks if neighbor data packet was overheard very recent 840. If no, the TX process loops back to the start 800. If yes, the data node sends a data packet to the parent to which the neighbor sent data packet 845, i.e., the parent with ID=ODRP. The data node then sets NDF=0 850 and the TX process loops back to the start 800. If PRF, PTF and NDF are off, the data node checks if parent data flag (PDF) is on 855. If yes, the data checks if queue overflow will occur 830. If no, the TX process loops back to the start 800. If queue will overflow 840, the data node checks if parent data packet was overheard very recent 840. If no, the TX process loops back to the start 800. If yes, the data node sends a data packet to the parent that transmitted data packet 845, i.e., the parent with ID=ODTP. The data node then sets PDF=0 850 and the TX process loops back to the start 800.

The data node uses number of buffered packets (NoBP), number of expected packets (NoEP) and queue capacity (QC) to determine if queue will overflow. In TX period, the data node does not expect to receive any relay data packet. Only expected data packets to be pushed into queue is self-generated data packets. Let RAP be remaining active period, then the NoEP=|RAP|*$R_S$. If NoBP+NoEP>QC, queue will overflow in current active period. Otherwise, queue will not overflow.

Data node determines if overhearing is very recent or not by using an overhearing threshold $OH_{TH}$. For the overheard parent data packet, if NOW−OPTXT<$OH_{TH}$, then overhearing is considered to be very recent, i.e., transmission parent is considered still active. Otherwise, overhearing is considered to be old, i.e., transmission parent is considered no longer active. For the overheard neighbor data packet, if NOW−ONTXT<$OH_{TH}$, then overhearing is considered to be very recent, i.e., receiving parent is considered still active. Otherwise, overhearing is considered to be old, i.e., receiving parent is considered no longer active. The overhearing threshold $OH_{TH}$ can be set to average gap between consecutive data packet transmission.

$$EW = \begin{cases} 0, & \text{for } MPN \\ \text{Total energy consumed} - \text{Energy consumed on packet } TX \text{ and } RX, & \text{for } BPN \end{cases} \quad (10)$$

To transmit a data packet, the data node needs to select the best parent. If parent RX flag (PRF) is on and there is only one parent in RX period, the dada node selects that parent. Otherwise, if PRF flag is on and there are multiple parents in RX period, the dada node selects parent with the best link quality, i.e., the smallest ETX. If parent TX flag (PTF) is on and there is only one parent in TX period, the dada node selects that parent. Otherwise, if PTF flag is on and there are multiple parents in TX period, the dada node selects parent with the best link quality. The best link needs the least retransmission, and therefore, saves energy.

In one embodiment of invention, data node sends a data packet to a parent in RX period. Data node sends a data packet to a parent in the parent's TX period only if queue will overflow, i.e., a data packet has to be deleted from queue. The data node sends a packet to a parent from which data packet transmission was overheard only if queue will overflow and overhearing is very recent, i.e., the parent is still active. The data node sends a packet to a parent to which a neighbor sent a data packet only if queue will overflow and overhearing is very recent, i.e., the parent is still active.

In one embodiment of invention, data node determines queue overflow by using buffered data packets, expected data packets and queue capacity. The expected data packets are computed based data packet self-generation rate and the length of remaining active period.

Battery Energy Efficient Routing

Some embodiments are based on a realization that the battery energy efficient routing of the data packets from a particular source data node to a destination node prefers the routing path consuming the least energy. For example, some embodiments transmit the data packets along a routing path reducing energy consumption of battery powered nodes.

For wireless networks, conventional routing metrics can be classified into two categories: non-energy related metrics, e.g., the expected transmission count (ETX), and energy related metrics, e.g., residual energy. The non-energy related metrics focus on throughput, latency, etc. and therefore, are not subjected to save energy. The energy related routing metrics only measure how much energy has been consumed or how much energy is still remaining. The conventional energy related metrics do not consider how energy has been consumed, i.e., wasted or used for packet transmission. In addition, the conventional energy related metrics are designed for homogeneous networks.

The energy consumption can be divided into two categories: energy waste and necessary energy use. The energy waste including energy consumed on idle listening, overhearing, collision and retransmission, etc. The necessary energy use including energy consumed on control packet receiving and transmission, data packet receiving and transmission, etc.

Accordingly, one embodiment provides energy saving metrics that take account of the detailed energy use.

The Energy Waste (EW) Metric

The EW metric is to minimize energy waste. Because idle listening is a major contributor to energy waste, the EW metric minimizes idle time of battery powered node.

In a heterogeneous network, the EW metric is defined as

EW is an additive metric and can be used to define different path costs with different objective functions. For example, with path cost "maximum EW on a path" and objective function "selecting path with the minimum {maximum EW on a path}", a node discovers a path that has the minimum peak energy waste. Because idle listening is a major contributor to energy waste, the path discovered has the least peak idle time. As a result, the battery powered nodes on paths with higher peak idle time can sleep more. Therefore, idle time of the battery powered nodes tends to be balanced.

EW metric can also be used defined other path cost and objective function. For example, with path cost "summation of EW on a path" and the objective function "selecting path with the minimum summation of energy waste", total energy waste is minimized.

The relay Energy (RE) Metric

The RE metric is to minimize energy consumed on performing router functions, and therefore, allows battery powered node to sleep more.

In a heterogeneous network, the RE metric is defined as $$RE = \begin{cases} 0, & \text{for } MPN \\ \text{Energy consumed on relay packet } TX \text{ and } RX, & \text{for } BPN \end{cases} \quad (11)$$

RE is an additive metric and can be used to define different path costs with different objective functions. For example, with path cost "maximum RE on a path" and objective function "selecting path with the minimum {maximum RE on a path}", a node discovers a path that has minimum peak relay. It allows battery powered nodes on paths with higher peak relay energy to sleep more. Therefore, workload of the battery powered nodes tends to be balanced.

The RE metric can also be used defined other path cost and objective function. For example, with path cost "summation of RE on a path" and the objective function "selecting path with the minimum total relay energy", the relay energy is balanced among paths.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. The processor can be connected to memory, transceiver, and input/output interfaces as known in the art.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A device to form a network of nodes including data nodes and at least one sink node, wherein the network is a multi-hop heterogeneous wireless network in which packets are exchanged between the sink node and the data nodes in a multi-hop manner such that there is at least one data node exchanging the packets with the sink node through at least one intermediate data node relaying the packets between the data node and the sink node, the data nodes include battery powered nodes (BPNs) and mains powered nodes (MPNs), wherein the device is a BPN comprising:
a transceiver to transmit and to receive data packets;
a memory to buffer the data packets in a queue;
a battery to provide energy to components of the BPN; and
a processor to determine a sleep schedule of the BPN independently from the sleep schedules of other data nodes in the network and independently from commands transmitted by the sink node, wherein the processor of the BPN switches the transceiver ON and OFF according to the sleep schedule to form an active period of BPN when the transceiver is switched ON and to form a sleep period of BPN when the transceiver is switched OFF, wherein the processor partitions at least part of the active period into a receiving (RX) period and a transmission (TX) period and causes the transceiver to transmit the data packets only during the TX period, wherein the components of the BPN include at least one or combination of the transceiver, the memory, and the processor.

2. The device of claim 1, wherein the RX period is followed by the TX period, and wherein the processor causes the transceiver to transmit a wakeup signal specifying the partitioning of the active period.

3. The device of claim 1, wherein the processor determines a self-generation rate of generating new data packets by the BPN, determines an incoming rate of receiving new data packets from the network, and determines a length of the active period based on a number of the data packets in the queue, the self-generation rate, and the incoming rate.

4. The device of claim 3, wherein the processor determines the incoming rate based on one or combination of a hop count of the BPN, a number of children nodes of the BPN, a probability of a child node sending packet to a battery powered parent (PoC2B) and a probability of a child node sending packet to a mains powered parent (PoC2M).

5. The device of claim 4, wherein the processor determines one or combination of the PoC2B and the PoC2M based on a parent active probability, a queue overflow probability, a link quality and a number of parents.

6. The device of claim 1, wherein the processor determines a self-generation rate of generating new data packets by the BPN, determines an incoming rate of receiving new data packets from the network, and determines a length of the sleep period based on a number of the data packets in the queue, a capacity of the queue, the self-generation rate, and the incoming rate.

7. The device of claim 6, wherein the processor extended the length of the active period with extended time period proportional to the number of the data packets in the queue.

8. The device of claim 1, wherein the processor determines a length of sleep period (|SP|) based on a number of data packets in the queue (NoBP), a self-generation rate $R_S$ of generating new data packets by the BPN and queue capacity (QC) as $$|SP| = \frac{QC - NoBP}{R_S},$$

wherein the |SP| is measured in time units, and the rate $R_S$ is measured in multiplicative inverse of the time units.

9. The device of claim 8, wherein the processor determines an incoming rate of receiving new data packets from the network and decreases the length of the sleeping period based on the incoming rate.

10. The device of claim 1, wherein the processor causes the transceiver to transmit a wakeup signal at the beginning of each active period to announce initial RX period length $|RXP|=\alpha*|RXP|_H+(1-\alpha)*|RXP|_P$ and initial TX period length $|TXP|=\alpha*|TXP|_H+(1-\alpha)*|TXP|_P$, wherein the processor causes the transceiver to an extension notification message to announce extension length |APE| of the active period, wherein a is a weight parameter with value in [0, 1], $|RXP|_H$ is a previous length of the RX period, $|RXP|_P$ is an estimated length of the RX period, $|TXP|_H$ is a previous length of the TX period, and $|TXP|_P$ is an estimated length of the TX period, wherein |APE|, $|RXP|_H$, $|RXP|_P$, $|TXP|_H$, $|TXP|_P$, RX, TX are measured in time units.

11. The device of claim 1, wherein the processor uses a wakeup timer to schedule a time to wake up, a sleep timer to schedule a time to sleep, and a TX timer to schedule a time to receive new data packets and a time to transmit the data packets stored in the queue.

12. The device of claim 1, wherein the transceiver receives a wakeup signal from a parent node indicating a RX period and a TX period of the parent node, such that the processor causes the transceiver to transmit the data packets to the parent node during the RX period of the parent node, and causes the transceiver to transmit the data packets to the parent node during the TX period if the queue of the BPN overflows.

13. The device of claim 1, wherein the processor determines that the queue overflows when a sum of a number of the data packets in the queue and a number of data packets self-generated during the active period is greater than a capacity of the queue.

14. The device of claim 1, wherein the processor causes the transceiver to transmit the data packets over a routing path minimizing energy waste.

* * * * *